(12) United States Patent
Ebrahimzad et al.

(10) Patent No.: US 10,587,358 B1
(45) Date of Patent: Mar. 10, 2020

(54) PROBABILISTIC CONSTELLATION SHAPING ACROSS TIME AND FREQUENCY

(71) Applicants: Hamid Ebrahimzad, Ottawa (CA); Michael Andrew Reimer, Stittsville (CA)

(72) Inventors: Hamid Ebrahimzad, Ottawa (CA); Michael Andrew Reimer, Stittsville (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/289,429

(22) Filed: Feb. 28, 2019

(51) Int. Cl.
*H04B 10/00* (2013.01)
*H04J 14/02* (2006.01)
*H04L 1/00* (2006.01)
*H04B 10/40* (2013.01)
*H04J 14/06* (2006.01)
*H04J 14/00* (2006.01)

(52) U.S. Cl.
CPC .......... *H04J 14/0298* (2013.01); *H04B 10/40* (2013.01); *H04J 14/06* (2013.01); *H04L 1/0061* (2013.01)

(58) Field of Classification Search
CPC .............. H04B 10/516; H04B 10/5161; H04B 10/5162; H04B 10/5165; H04B 10/6167; H04B 10/524; H04B 10/532; H04B 10/54; H04B 10/541; H04B 10/548; H04B 10/556; H04B 10/5561; H04B 10/5563
See application file for complete search history.

(56) References Cited

U.S. PATENT DOCUMENTS

| | | | |
|---|---|---|---|
| 6,313,932 B1 | 11/2001 | Roberts et al. | |
| 9,698,939 B2 | 7/2017 | Oveis Gharan et al. | |
| 10,396,899 B1 | 8/2019 | Kim et al. | |
| 2005/0074037 A1 | 4/2005 | Rickard et al. | |
| 2017/0271837 A1* | 9/2017 | Hemenway | G02B 6/03638 |
| 2019/0149239 A1* | 5/2019 | Tehrani | H04B 10/504 |
| | | | 398/183 |

OTHER PUBLICATIONS

"Series G: Transmission Systems and Media, Digital Systems and Networks: Digital sections and digital line system—Optical fibre submarine cable systems", ITU-T Recommendation G.975.1, Feb. 2004.

(Continued)

*Primary Examiner* — Daniel G Dobson
(74) *Attorney, Agent, or Firm* — Integral Intellectual Property Inc.; Amy Scouten; Miriam Paton

(57) ABSTRACT

An optical transmitter is operative to generate, from a plurality of encoded client bits, a set of symbols exhibiting non-uniform visitation probabilities in at least one dimension, to encode the set of symbols across a plurality of frequency division multiplexing (FDM) subcarriers, and to transmit an optical signal comprising the plurality of FDM subcarriers across which the set of symbols is encoded. An optical receiver is operative to decode a set of symbol estimates from a plurality of FDM subcarriers, the symbol estimates comprising estimates of symbols exhibiting non-uniform visitation probabilities in at least one dimension, and to recover client bits from the set of symbol estimates.

20 Claims, 11 Drawing Sheets

(56) References Cited

OTHER PUBLICATIONS

"Series G: Transmission Systems and Media, Digital Systems and Networks: Packet over Transport aspects—Quality and availability targets", Recommendation ITU-T G.8201, Apr. 2011.
Agrell, et al., "Power-Efficient Modulation Formats in Coherent Transmission Systems", Journal of Lightwave Technology, vol. 27, No. 22, Nov. 15, 2009.
Bliss, "Circuitry for Performing Error Correction Calculations on Baseband Encoded Data to Eliminate Error Propagation", ip.com, Mar. 1, 1981.
Bocherer, "Achievable Rates for Probabilistic Shaping", May 23, 2018.
Bocherer, et al., "High Throughput Probabilistic Shaping with Product Distribution Matching", Feb. 24, 2017.
Calderbank, et al., "Nonequiprobable Signaling on the Gaussian Channel", IEEE Transactions on Information Theory, vol. 36, No. 4, Jul. 1990.
Chang, et al., "Forward Error Correction for 100 G Transport Networks", IEEE Communications Magazine, Mar. 2010.
Djordjevic, et al., "Constrained Coding Techniques for the Suppression of Intrachannel Nonlinear Effects in High-Speed Optical Transmission", Journal of Lightwave Technology, vol. 24, No. 1, Jan. 2006.
Fan, et al., "Constrained Coding Techniques for Soft Iterative Decoders", Global Telecommunications Conference—Globecom'9, 1999.
Forney, Jr., et al., "Multidimensional Constellations—Part I: Introduction, Figures of Merit, and Generalized Cross Constellations", IEEE Journal on Selected Areas in Communications, vol. 7, No. 6, Aug. 1989.
Kschischang, et al., "Optimal Nonuniform Signaling for Gaussian Channels", IEEE Transactions on Information Theory, vol. 39, No. 3, May 1993.
Mahadevappa, et al., "Comparison of 128QAM mappings/labelings for 802.11n", Nov. 2003.
Ramabadran, "A Coding Scheme for m-out-of-n Codes", IEEE Transactions on Communications, vol. 38, No. 8, Aug. 1990.
Raphaeli, et al., "Constellation Shaping for Pragmatic Turbo-Coded Modulation With High Spectral Efficiency", IEEE Transactions on Communications, vol. 52, No. 3, Mar. 2004.
Roberts, et al., "Performance of Dual-Polarization QPSK for Optical Transport Systems", Journal of Lightwave Technology, vol. 27, No. 16, Aug. 15, 2009.
Schulte, et al., "Divergence-Optimal Fixed-to-Fixed Length Distribution Matching With Shell Mapping", Dec. 13, 2018.
Yoshida, et al., "Hierarchical Distribution Matching for Probabilistic Shaped Coded Modulation", Dec. 26, 2018.
Cho, et al., "Low-Complexity Shaping for Enhanced Nonlinearity Tolerance", 42nd European Conference and Exhibition on Optical Communications, Sep. 18-22, 2016.
Fischer, "Precoding and Signal Shaping for Digital Transmission", John Wiley & Sons, Inc., 2002, ISBN: 0-471-22410-3.
Jansen, et al., "Coherent Optical 25.8-Gb/s OFDM Transmission Over 4160-km SSMF", Journal of Lightwave Technology, vol. 26, No. 1, pp. 6-16, Jan. 1, 2008.
Khandani, et al., "Shaping multidimensional signal spaces. I. Optimum shaping, shell mapping", IEEE Transactions on Information Theory, vol. 39, Issue 6, 1993.

\* cited by examiner

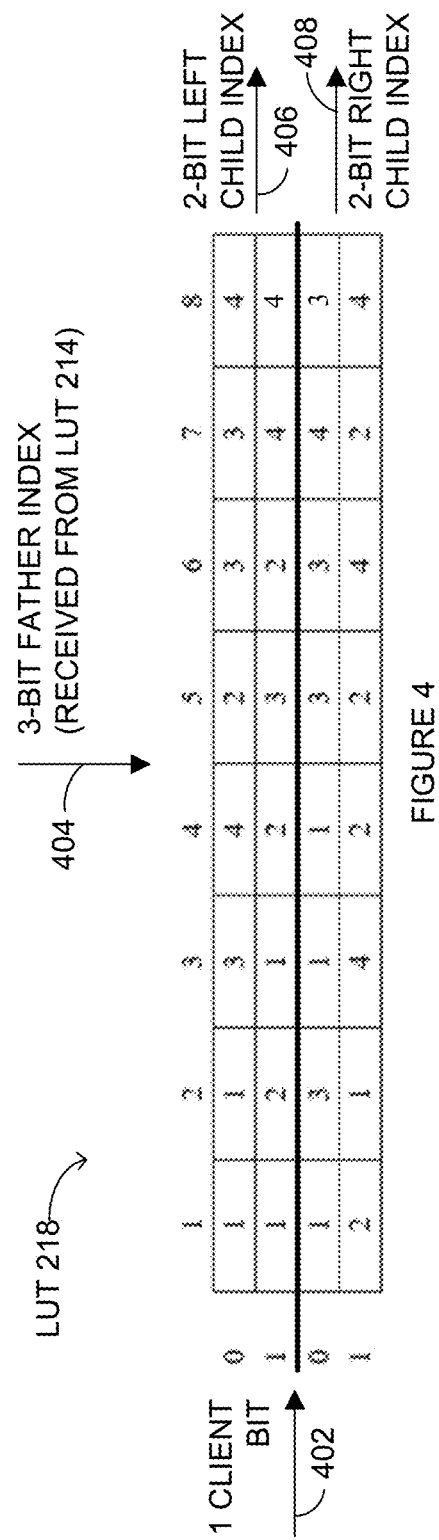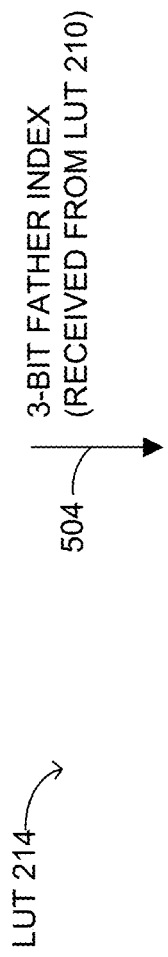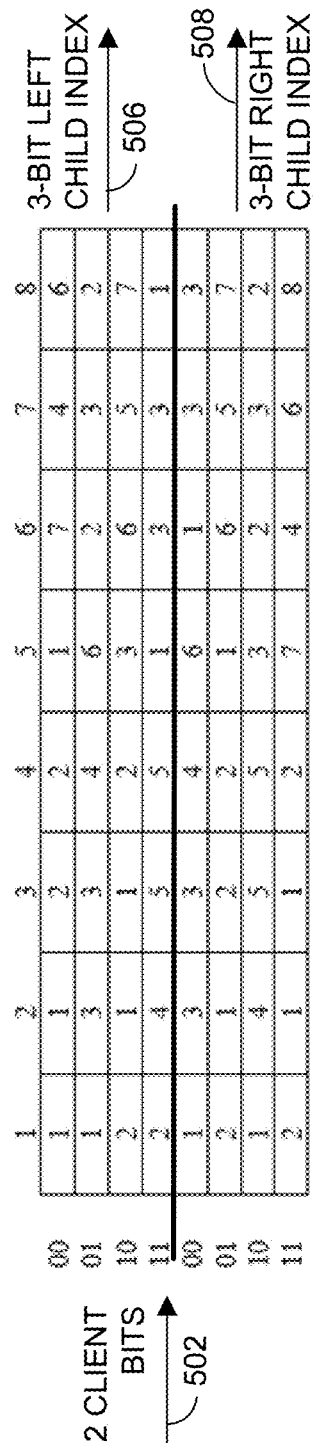

PROBABILISTIC CONSTELLATION SHAPING ACROSS TIME AND FREQUENCY

TECHNICAL FIELD

This document relates to the technical field of optical communications.

BACKGROUND

In an optical communication system, an optical transmitter may encode digital information in the form of bits by mapping the bits to symbols, and then using a particular modulation scheme to modulate one or more optical carriers with the symbols. The optical transmitter thereby generates an optical signal to be transmitted via an optical communication channel to an optical receiver, where the optical signal is representative of the digital information. The optical receiver may process an optical signal received via the optical communication channel to recover estimates of the symbols, estimates of the bits, or both.

The optical signal received at the optical receiver may comprise a degraded version of the optical signal that was generated at the optical transmitter. Various components of the optical communication system that may contribute to signal degradation include optical fibers, optical amplifiers, filters, isolators, and the like. Amplifier noise, optical non-linearity, polarization-dependent loss or gain (PDL or PDG), polarization mode dispersion (PMD), frequency-dependent loss, and other effects may introduce noise and/or distortion into the signal. The amplitude of the noise relative to the amplitude of the optical signal may be characterized by signal-to-noise ratio (SNR), or alternatively by noise-to-signal ratio (NSR). The NSR may be convenient when dissecting noise sources. A high NSR may result in noisy symbol estimates, which may in turn produce erroneous estimates of the bits. The probability that bit estimates recovered at the optical receiver differ from the original bits encoded at the optical transmitter may be characterized by the Bit Error Ratio or Bit Error Rate (BER). A given application may have a maximum BER tolerance. For example, an application may require that the BER does not exceed $10^{-15}$.

Forward Error Correction (FEC) techniques may be used to reduce the BER. Instead of mapping the original bits of information from the client (referred to as client bits) directly to symbols, the client bits may first undergo FEC encoding based on a chosen FEC scheme. The resulting FEC-encoded bits include redundant information, such as parity or check bits. The bit estimates recovered at the optical receiver are estimates of the FEC-encoded bits that were generated at the optical transmitter. These estimates may undergo FEC decoding at the optical receiver based on the chosen FEC scheme. The FEC decoding makes use of the redundant information that was included in the FEC-encoded bits in order to detect and correct bit errors. Ultimately, estimates of the original client bits may be recovered from the FEC-decoded bit estimates.

FEC encoding is advantageous in that it acts to reduce the received BER without the need to resend data packets. However, this is at the cost of an increased overhead. The amount of overhead or redundancy added by FEC encoding may be characterized by the information rate R, where R is defined as the ratio of the length of the input data sequence to the length of the output data sequence after FEC encoding (which includes the overhead). For example, if FEC encoding adds 25% overhead, then for every four bits that are to be FEC-encoded, the FEC encoding will add 1 bit of overhead, resulting in 5 FEC-encoded bits to be transmitted to the optical receiver. This corresponds to an information rate R=4/5=0.8.

SUMMARY

According to a broad aspect, an optical transmitter is operative to generate, from a plurality of encoded client bits, a set of symbols exhibiting non-uniform visitation probabilities in at least one dimension. The optical transmitter is further operative to encode the set of symbols across a plurality of frequency division multiplexing (FDM) subcarriers. The optical transmitter is further operative to transmit an optical signal comprising the plurality of FDM subcarriers across which the set of symbols is encoded.

According to some examples, the optical transmitter is operative to encode different subsets of the set of symbols on different FDM subcarriers using a permutation function available at the optical transmitter.

According to some examples, at least one of the different subsets comprises consecutive symbols within the set of symbols.

According to some examples, at least one of the different subsets comprises non-consecutive symbols within the set of symbols.

According to some examples, the permutation function may be programmed based on one or more properties of an optical communication link over which the optical signal is transmitted.

According to some examples, the permutation function may be programmed to provide different capacities on different FDM subcarriers.

According to some examples, the optical transmitter is operative to generate the encoded client bits using a plurality of look-up tables (LUTs) available at the optical transmitter.

According to some examples, the plurality of LUTs may be programmed based on one or more properties of an optical communication link over which the optical signal is transmitted.

According to another broad aspect, an optical receiver is operative to receive an optical signal over an optical communication link established between the optical receiver and an optical transmitter, wherein the received optical signal comprises a plurality of frequency division multiplexing (FDM) subcarriers. The optical receiver is further operative to decode a set of symbol estimates from the plurality of FDM subcarriers, the symbol estimates comprising estimates of symbols exhibiting non-uniform visitation probabilities in at least one dimension. The optical receiver is further operative to recover a plurality of client bits from the set of symbol estimates.

According to some examples, the optical receiver is operative to decode different subsets of the symbol estimates from different FDM subcarriers using an inverse permutation function available at the optical receiver.

According to some examples, at least one of the different subsets comprises consecutive symbol estimates of the set of symbol estimates.

According to some examples, at least one of the different subsets comprises non-consecutive symbol estimates of the set of symbol estimates.

According to some examples, the optical receiver is operative to recover the plurality of client bits using a plurality of LUTs available at the optical receiver.

BRIEF DESCRIPTION OF THE DRAWINGS

FIG. 4 illustrates an example look-up table (LUT) for a second layer of the PCS encoding structure of FIG. 2;

FIG. 5 illustrates an example LUT for a third layer of the PCS encoding structure of FIG. 2;

DETAILED DESCRIPTION

Figure 1:
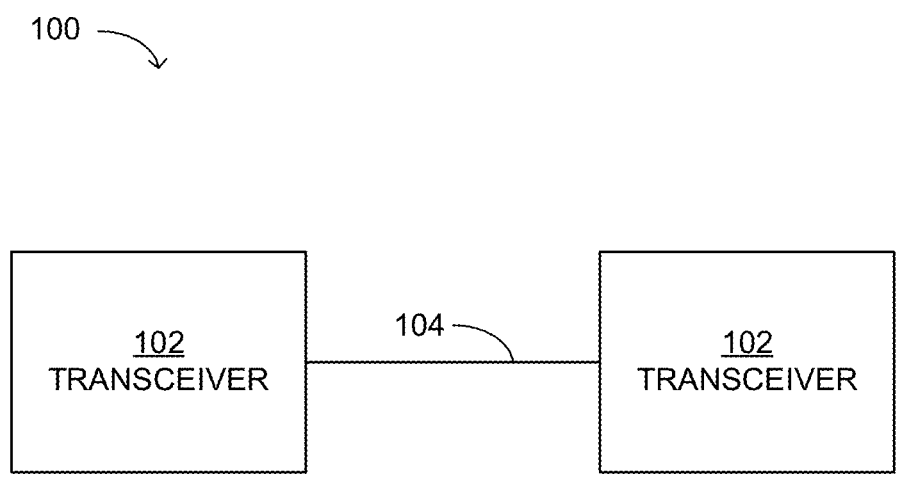
FIG. 1 illustrates an example optical communication system in accordance with the technology disclosed herein.

FIG. 1 illustrates an optical communication system 100 in accordance with the technology disclosed herein. The communication system 100 comprises optical transceivers 102. An optical signal, representative of digital information, is transmitted between the optical transceivers 102 via an optical communication channel 104 established over an optical communication link between the optical transceivers 102. For the purposes of the present disclosure, it is convenient to consider the optical signal as a function of four orthogonal dimensions versus time. The four orthogonal dimensions comprise the respective in-phase (I) and quadrature (Q) components of each of two orthogonal polarizations, denoted generically as X and Y. For notation purposes, the four dimensions at a particular time interval, t, may be denoted as XI(t), XQ(t), YI(t), and YQ(t).

The optical transceivers 102 may be flexible, such that various configuration parameters of the optical transceivers 102 can be adjusted. For the optical communication system 100 to be operative, the configuration parameters of an optical transmitter section of one of the optical transceivers 102 must be compatible with the configuration parameters of an optical receiver section of the other of the optical transceivers 102. Examples of configuration parameters include, but are not limited to, a modulation format or scheme, a symbol rate, forward error correction (FEC) parameters, digital signal processing (DSP) parameters, pulse shaping parameters, the number of subcarriers for frequency division multiplexing (FDM), chromatic dispersion compensation parameters, carrier phase recovery parameters, and digital nonlinear compensation parameters.

A signal transmitted via the optical communication channel 104 may be altered by various elements of the optical communication system, such as optical fibers, optical amplifiers, filters, isolators, wavelength-selective switches, and the like. For example, the passage of a signal through an optical fiber or an optical filter may attenuate the optical signal, whereas the passage of the signal through an optical amplifier may strengthen the signal and contribute noise. The signal loss (or signal gain) caused by a given component may depend on the polarization state of the signal. In general, this effect is referred to as polarization-dependent loss or gain (denoted PDL or PDG). Where information is transmitted on a carrier frequency using two orthogonal polarization states, a given element of the system may cause each polarization to experience a different level of PDL. PDL is cumulative across all elements in the optical communication system. As a result of PDL, the optical signal-to-noise ratio (OSNR) on one polarization may be lower than the OSNR on the other polarization.

Random imperfections or mechanical stresses in an optical fiber may cause light in two orthogonal polarizations to propagate with different group velocities. This effect, referred to as polarization mode dispersion (PMD), causes the two polarization components of a signal to drift apart over the length of an optical fiber, thereby causing pulse broadening and distortion. An optical system may be characterized by a mean value of the PMD, also referred to as the mean differential group delay (DGD). PMD compensation may be achieved using an adaptive filter at the optical receiver, such as a least-mean-squares (LMS) circuit.

Degradations in the optical signal may also be dependent on frequency. For example, different FDM channels may experience different levels of attenuation, or different levels of distortion following optical filtering.

The reliability of a communication channel may be characterized by the Bit Error Ratio or Bit Error Rate (BER), which measures the ratio of erroneously received bits to the total number of bits that are transmitted over the communication channel. The term "client bits" may herein be understood to refer to original bits intended for communication from a transmitter to a receiver in a communication system. The term "bits" may herein be understood to comprise client bits, or bits calculated from client bits, or both.

In a standard coherent transmission system, an optical transmitter may encode bits by mapping them to symbols, where each symbol is selected from a set of M possible symbol candidates. Together, the M symbol candidates form a set of M "constellation points" or an "M-point constellation" (or simply "constellation"). In what follows, the terms "symbol" and "constellation point" may be used interchangeably to refer to a single member of the M-point constellation. In certain contexts, the term "symbol" may also refer to a particular constellation point selected from the constellation by the optical transmitter based upon the bits to be encoded for transmission. The $K^{th}$ symbol (i.e. constellation point) may be denoted by a symbol vector $\vec{S}_K = [s_{K,1}, s_{K,2}, \ldots s_{K,N}]$, where $s_{K,i}$ is the $i^{th}$ component of the $K^{th}$ symbol vector, K=1, 2 . . . , M, and N is the number of dimensions. Each symbol selected from the constellation may be uniquely mapped to an optical signal, such that each component of the symbol vector is mapped to a respective dimension XI, XQ, YI, YQ, across one or more time intervals, and across one or more FDM subcarriers.

In general, a constellation may consist of a finite number of distinct constellation points. The constellation points may be representatives of a finite set of distinct bit-sequences. A conventional labeling scheme may be a one-to-one correspondence that associates the set of constellation points with the set of bit-sequences, such that each constellation point may correspond to exactly one bit-sequence (or sequence of bits), and no two distinct constellation points may correspond to the same bit-sequence, and vice versa. The bit-sequence that corresponds to a constellation point is called the label of the constellation point.

The term "visitation probability" is used herein to refer to the probability that a particular symbol will be selected from the set of M possible symbol candidates. For example, given an M-point constellation, the visitation probability for the $K^{th}$ symbol in the constellation may be denoted by $P_K$, for K=1, 2, . . . , M.

The average energy $\langle E \rangle$ of all the symbols in an M-point constellation may be calculated using Eq. 1.

$$\langle E \rangle = \sum_{k=1}^{M} P_K E_k \quad (1)$$

where $E_k = |\vec{S}_K|^2$ denotes the energy of the $K^{th}$ symbol.

The entropy H, measured in bits, of the encoding may be calculated using Eq. 2.

$$H = -\sum_{K=1}^{M} P_K \log_2(P_K) \quad (2)$$

For conventional modulation, all symbols in a constellation exhibit the same the visitation probability, and the entropy is $H=\log_2(M)$. If the symbols transmitted in different time intervals are statistically independent, the constellation is capable of encoding $N_B = H$ bits per symbol. If the symbols transmitted in different time intervals are dependent, the transmit symbols are only capable of encoding $N_B \leq H$ bits per symbol.

In a conventional coherent transmission system, the mapping of bits to symbols generally results in an unbiased selection of constellation points from the M possibilities, and consecutive symbols are independent of each other. That is, bits are encoded such that each symbol in the M-point constellation has the same visitation probability, namely $P_K=1/M$. Under these circumstances, Eq. 2 dictates that the M-point constellation will encode a total of $N_B=\log_2(M)$ bits per symbol.

Improvements in additive white Gaussian noise (AWGN) tolerance may be achieved by attempting to minimize the average symbol energy $\langle E \rangle$ for a specified number of bits per symbol $N_B$ and a specified minimum Euclidean distance among the constellation points. As shown in Eq. 1, the average symbol energy $\langle E \rangle$ is dependent on the energy $E_k = |\vec{S}_K|^2$ of each of the M constellation points and its respective visitation probability $P_K$. At a constant SNR, constellation entropy H, and a fixed minimum Euclidean distance, the optimal visitation probabilities in an AWGN channel are those that follow a Maxwell-Boltzmann distribution characterized by a parameter $\lambda > 0$, as provided in Eq. 3.

$$P_K = \frac{\exp(-\lambda E_k)}{\sum_{K=1}^{M} \exp(-\lambda E_k)} \quad (3)$$

In general, the optimal visitation probabilities for the symbols in a constellation may be unequal, such that $P_K \neq 1/M$. Techniques used to achieve unequal or non-uniform visitation probabilities for the symbols in a set of constellation points are generally referred to as "probabilistic constellation shaping" or PCS. PCS may be used to improve the AWGN tolerance relative to conventional modulation. In addition, PCS can also be used to vary the raw capacity, in a substantially continuous manner, without requiring the support for multiple discrete constellations.

In general, the relationship between the achievable information rate and the visitation probabilities $P_K$ for K=1, 2, . . . , M may be described by the optimization problem indicated in Eq. 4

$$\min_{P_K} \sum_{k=1}^{M} P_K E_k \quad (4)$$

subject to:

$$-\sum_{k=1}^{M} P_K \log_2(P_K) = \text{constant and} \sum_{k=1}^{M} P_K = 1$$

According to some examples, PCS may be implemented by applying PCS encoding prior to FEC encoding at an optical transmitter, and by subsequently applying PCS decoding after FEC decoding at a corresponding optical receiver. For example, the PCS encoding may be applied to blocks of client bits at the optical transmitter to produce "shaped" or "unbalanced" bits. This terminology is used to reflect the fact that each bit output by the PCS encoding has an unequal probability of being zero and being one. For example, a shaped bit produced by the PCS encoding may be more likely to have a value of zero than a value of one. This is in contrast to the average client bit, which is equally likely to have value of zero and a value of one, and is therefore generally referred to as "unshaped" or "balanced". The shaped bits produced by PCS encoding may subsequently be FEC-encoded and ultimately mapped to symbols, where each symbol is selected from a set of constellation points. As a result of the PCS encoding, the probability of selecting certain constellation points may be greater than the probability of selecting other constellation points. In other words, visitation probabilities of the points in the constellation may be unequal or non-uniform. At the optical receiver, blocks of FEC-encoded, shaped bit estimates may be recovered from received symbol estimates. After FEC decoding has been applied to the shaped bit estimates, PCS decoding may be applied to produce blocks of corrected client bits.

In U.S. Pat. No. 9,698,939, Oveis Gharan et al. describe techniques for PCS using algebraic encoding and tree encoding. In "Low-complexity shaping for enhanced nonlinearity tolerance", *Proceedings of ECOC* 2016, pp. 467-469, Cho et al. describe "cut-and-paste" or CAP encoding, which is another technique for PCS.

The algebraic encoding described by Oveis Gharan et al. and the CAP encoding described by Cho et al. directly modify the symbol visitation probabilities $P_K$, for K=1, 2, . . . , M. For example, the algebraic encoding may be implemented using a series of recursive calculations applied to a large block of N symbols, where the calculations force the number of symbols of the M types to be exactly $NP_K$, where $P_K$ has been previously defined for K=1, 2, . . . , M. The complexity of the algebraic encoding increases linearly with N. With algebraic encoding, the symbols are uncorrelated across different time intervals. While this may provide improved linear performance, the lack of correlation across time may increase nonlinear interference during fiber propagation.

The tree encoding described by Oveis Gharan is related to the concept of shell mapping, as described by Khandani and Kabal in "Shaping multidimensional signal spaces. I. Optimum shaping, shell mapping", *IEEE Transactions on Information Theory*, Vol. 39, Issue 6, 1993, and by Fischer in "Precoding and Signal Shaping for Digital Transmission", John Wiley & Sons, Inc., 2002, ISBN: 0-471-22410-3. In contrast to algebraic encoding, the shaping algorithm used in shell mapping does not address each symbol individually. Instead, shell mapping considers groups of symbols having similar energy levels.

As previously described, a symbol may be uniquely represented by an optical signal, such that each unique combination of components of the optical signal along the respective dimensions XI, XQ, YI, YQ, and across one or more time intervals, and possibly across one or more FDM subcarriers, corresponds to one of M symbols. Unlike algebraic encoding, which typically considers two-dimensional (complex) symbols encoded across one polarization of one time interval, tree encoding considers multi-dimensional symbols encoded across a plurality of time intervals. Each time interval is modulated with a "base constellation", such as 16QAM or 64QAM. For example, where symbols are encoded across 128 time intervals, there will be a total of $N_{dim}=4\times128=512$ modulated dimensions, in which the factor of four accounts for the XI, XQ, YI and YQ dimensions of one time interval. With a 64QAM base constellation encoding six bits in two dimensions, that is, three bits per real dimension and three bits per imaginary dimension, this leads to a total of $2^{3\times512}=2^{1536}\approx10^{462}$ possible symbols in 512 dimensions. For standard unshaped modulation, the set of all possible transmitted symbols may be viewed as a uniform lattice of constellation points in a 512-dimensional hyper-cube, with all constellation points having an equal visitation probability. However, it may be shown that the average symbol energy $\langle E \rangle$ is minimized by selecting a subset of the constellation points lying within the volume of a 512-dimensional hyper-sphere. That is, to minimize the average symbol energy $\langle E \rangle$, each constellation point lying within the hyper-sphere may have an equal visitation probability, while each constellation point lying outside the hyper-sphere may have zero visitation probability. The number of bits that can be encoded per 512-dimensional symbol is $\log_2(L)$, where L denotes the number of constellation points lying within the hyper-sphere. Further, the L 512-dimensional symbols appear to have unequal symbol visitation probabilities when projected down into two dimensions, for example, I and Q of the X-polarization. More generally, the multi-dimensional symbols generated using tree encoding may be understood as exhibiting non-uniform visitation probabilities in at least one dimension.

Since the radius of the hyper-sphere uniquely determines both the number L of constellation points lying within the hyper-sphere, as well as the average symbol energy $\langle E \rangle$, there is a well-defined relationship between the average symbol energy $\langle E \rangle$, and the achievable transmission rate.

However, in order to achieve equal symbol visitation within a 512-dimensional hyper-sphere, it would be necessary to uniquely label and index more constellation points than there are atoms in the universe, which would be prohibitively expensive in terms of computational resources. The PCS technique of tree encoding reduces the immense size of this indexing problem through iterative "merging" and "clipping" of a set (or sets) of symbol energies via the programming of a series of look-up-tables (LUT) in a tree structure.

Typically, the set of symbol energies is taken to be the set of unique symbol energies of the base constellation. For example, considering a standard 16-QAM constellation, the 16 complex symbols have only three unique symbol energies, denoted as $E^{(1)}$, $E^{(2)}$ and $E^{(3)}$, such that the set of symbol energies is $S=\{E^{(1)}, E^{(2)}, E^{(3)}\}$. However, the set of symbol energies may also be constructed in a more general manner. For example, the set of symbol energies may contain an arbitrary selection of symbol energies from the constellation. Alternatively, the nonlinear interference generated during transmission over an optical fiber may be reduced by programming the tree according to a set of "quasi-energies", in which case the symbol energy $E_K=|\vec{S}_K|^2$ is replaced by a function, $QE_K=f(\vec{S}_K)$, where $QE_K$ is the quasi-energy of the $K^{th}$ symbol, while $f(\vec{S}_K)$ is a specified functional mapping. For example, the symbol energy may be replaced by the quasi-energy $QE_K=|\vec{S}_K|^4$, although numerous other mappings are possible. Throughout the following disclosure, the elements of the set of symbol energies (or quasi-energies) will be referred to as "energy shells".

The LUTs are programmed in a series of layers, beginning with a base constellation at the bottom layer, such as 16-QAM, 64-QAM, 256-QAM, or some other base constellation. At each layer of the tree structure, a set of possible combinations of energy shells is constructed from the Cartesian product of the energy shells of the preceding layer, and the set is indexed with a LUT. In order to adhere to practical implementation considerations, such as memory and cost limitations, the number of bits used for each LUT may be reduced by averaging shells with similar energies (referred to as "merging") and/or by removing the highest energy shells (referred to as "clipping"). This process of merging and clipping may be applied at each layer of the tree until a desired capacity is achieved. The precise rules for merging and clipping may be designed to optimize linear and/or nonlinear propagation characteristics of the tree encoded signal. The merging and clipping parameters at each layer may be obtained using numerical simulations.

In general, "PCS encoding" may be used herein to refer to the process of generating shaped symbols from client bits. Thus, PCS encoding may include tree encoding to generate shaped bits, followed by FEC encoding to generate FEC-encoded, shaped bits, and followed by bit-to-symbol mapping to generate shaped symbols from the FEC-encoded, shaped bits. Similarly, "PCS decoding" may be used herein to refer to the process of recovering client bits from estimates of shaped symbols. Thus, PCS decoding may include symbol-to-bit demapping to derive estimates of FEC-encoded, shaped bits, followed by FEC decoding to recover corrected, shaped bits, and followed by tree decoding to recover corrected client bits from the corrected, shaped bits.

The description herein will focus on examples in which PCS encoding is implemented using a tree encoding structure, and in which PCS decoding is implemented using a tree decoding structure. However, it should be understood that PCS encoding and PCS decoding may alternatively be implemented using other techniques, such as algebraic encoding and algebraic decoding.

Figure 2:
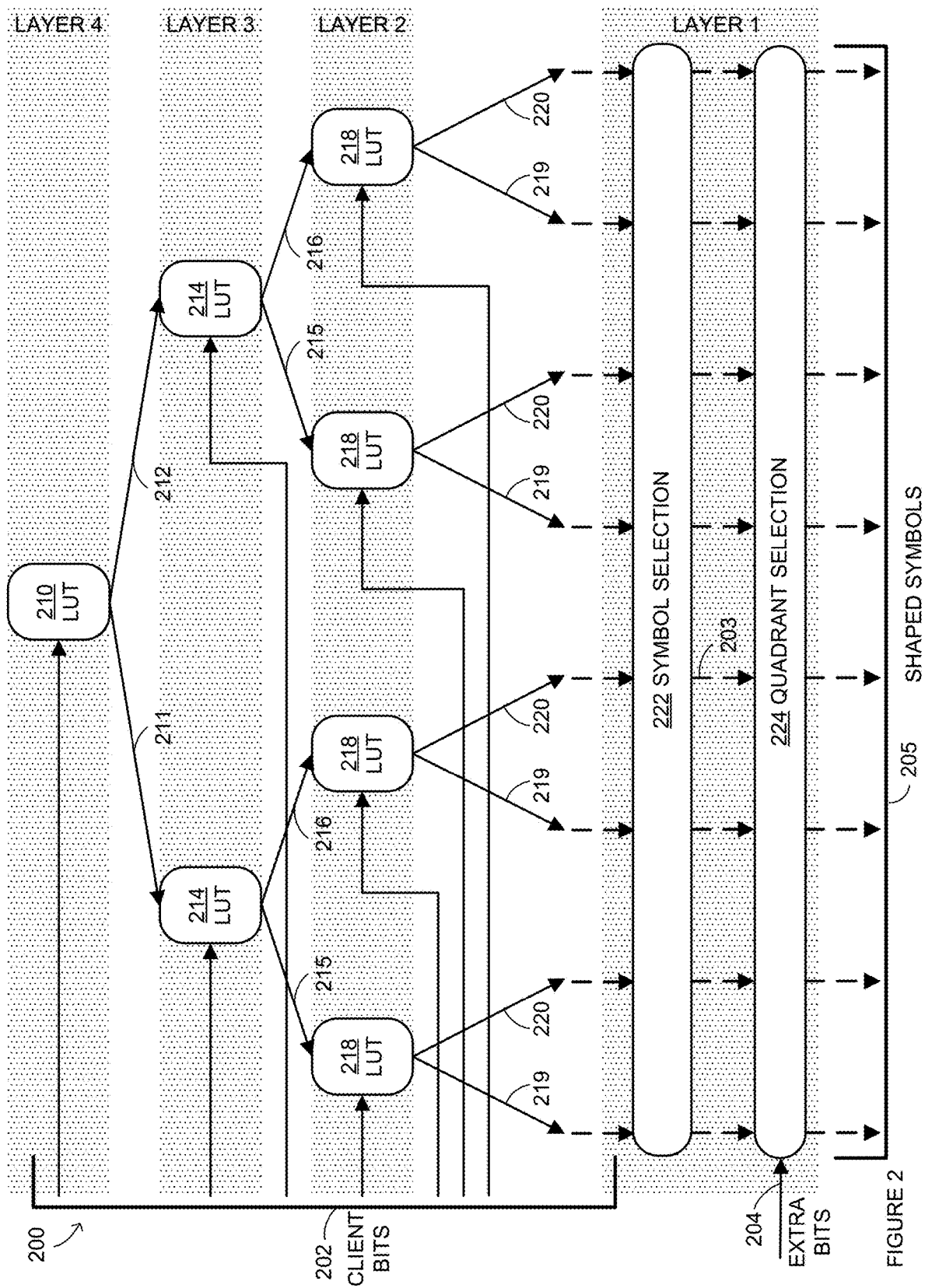
FIG. 2 illustrates a schematic of an example encoding structure for probabilistic constellation shaping (PCS) using tree encoding.

FIG. 2 illustrates a schematic of an example structure 200 for PCS encoding. Bits 202 and 204 are input to the PCS encoding structure 200, and shaped symbols 205 are output by the PCS encoding structure 200. The bits 202 and 204 may be referred to as "unshaped" or "balanced", in that they are equally likely to have a value of zero and a value of one. The shaped symbols 205 generated by the PCS encoding structure 200 are selected from a set of constellation points, where a probability of selection is non-uniform across the set. The bits 202 may comprise client bits. The bits 204 may also comprise client bits. Alternatively, or additionally, the bits 204 may comprise parity bits output from FEC encoding. For ease of explanation, the bits 202 may herein be referred to as client bits 202, while the bits 204 may herein be referred to as extra bits 204. For the purposes of the following simple example, FEC encoding is ignored. The use of FEC encoding in conjunction with PCS encoding will be described further with respect to FIG. 8.

The example PCS encoding structure 200 comprises four layers. However, higher and lower numbers of layers are contemplated. The delineation of the contents of each layer is provided merely for ease of explanation. It should be understood that the layers may be defined differently than what is described below.

Layers 2, 3, and 4 of the PCS encoding structure 200 correspond to a tree encoding structure (also referred to herein as a "tree encoder"), which receives the unshaped client bits 202 as input, and outputs shaped bits 219, 220.

Layer 1 of the PCS encoding structure 200 corresponds to the mapping of the shaped bits 219, 220 and the extra bits 204 to shaped symbols 205 of a base constellation. The mapping performed in Layer 1 may be better understood by considering a specific base constellation as an example.

Figure 3:
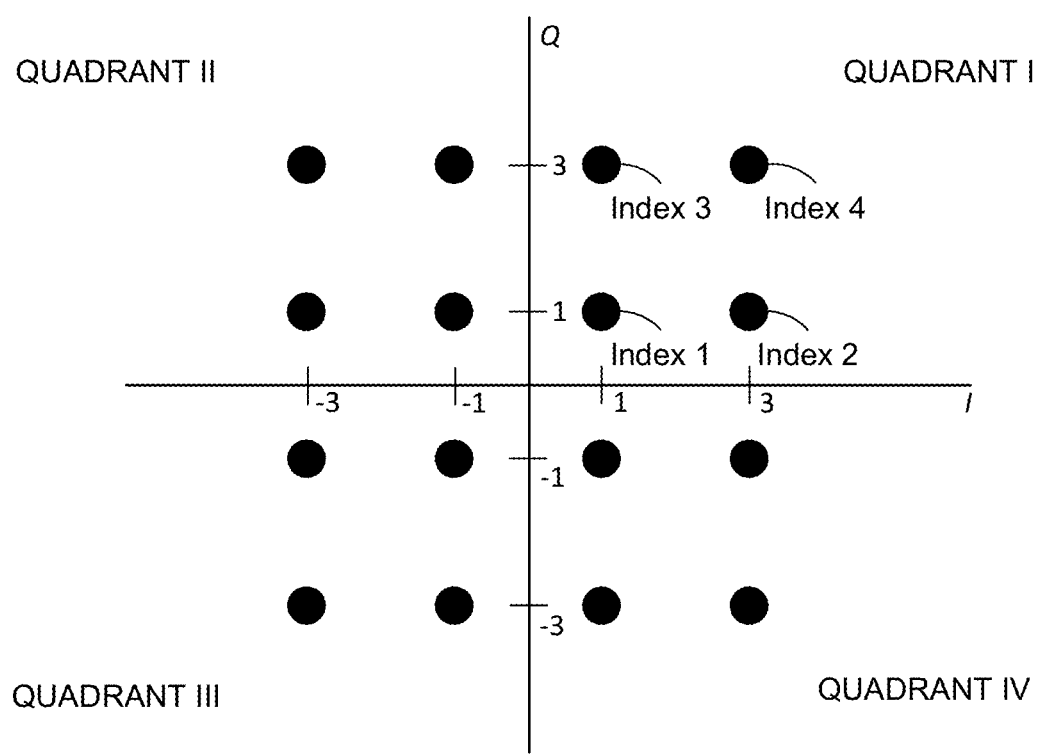
FIG. 3 illustrates a 16-QAM base constellation on which the example PCS encoding structure of FIG. 2 may operate.

FIG. 3 illustrates a 16-QAM base constellation upon which Layer 1 of the PCS encoding structure 200 may operate. Because the constellation points are symmetric between Quadrants I-IV, the PCS encoding structure 200 may be programmed based on only those points in Quadrant I, where the points in Quadrant I correspond to a plurality of different energy shells. Unshaped bits may subsequently be used to randomly select between Quadrants I-IV, thereby resulting in the same relative visitation probabilities for corresponding constellation points in each quadrant (i.e., points belonging to the same energy shell). Returning back to FIG. 2, symbol selection 222 may be applied to the shaped bits 219, 220 to select symbols 203 from the constellation points located in Quadrant I. The extra bits 204 may be used to apply quadrant selection 224 to the symbols 203 corresponding to the points in Quadrant I, thereby generating the shaped symbols 205 which are selected from the entire set of constellation points spanning all four quadrants of the 16-QAM base constellation.

Referring again to FIG. 3, the points in Quadrant I may be indexed in order of ascending energy, such that the point closest to the origin is in the lowest energy shell, while the point furthest from the origin is in the highest energy shell. Where energy is expressed as the square of the distance from the origin, the respective energies of the points are denoted in Table 1. Although the points having indices 2 and 3 exhibit the same energy, for the purposes of the following discussion, these points may be understood as belonging to distinct energy shells. Thus, each index in Table 1 corresponds to a different energy shell.

TABLE 1

| Index | 1 | 2 | 3 | 4 |
|-------|---|----|----|----|
| Energy | 2 | 10 | 10 | 18 |

Returning back to FIG. 2, Layers 2, 3, and 4 correspond to sets of LUTs which have been programmed in a bottom-up manner. That is, the LUTs 218 of Layer 2 may be programmed based on the base constellation of Layer 1; the LUTs 214 of Layer 3 may be programmed based on the programming of the LUTs 218 of Layer 2; and the LUT 210 of Layer 4 may be programmed based on the programming of the LUTs 214 of Layer 3. The programming of each of the LUTs 210, 214, and 218 may involve merging and/or clipping. Once programmed, the contents of the LUTs 210, 214, and 218 will govern the operation of the tree encoder, which is defined by Layers 2, 3, and 4 of the PCS encoding structure 200.

At Layer 1 of the PCS encoding structure 200, each symbol is represented by one of the four possible energy shells, indexed from 1 to 4, as provided in Table 1 and FIG. 3.

At Layer 2 of the PCS encoding structure 200, the LUTs 218 may be programmed by first determining the 16 possible combinations of energy shells resulting from the selection of two of the symbols in FIG. 3. For this reason, Layer 2 may be referred to as the "two-symbol" layer. Since the symbols in FIG. 3 are represented by coordinates in I and Q, they may be referred to as two-dimensional symbols. Accordingly, when two of these two-dimensional symbols are combined, the result may be referred to as a four-dimensional symbol, since there are two I coordinates and two Q coordinates, for a total of four coordinates. The 16 possible energy shells for the four-dimensional symbols are provided in Table 2. These energy shells are indexed by 1 to 16.

TABLE 2

| Index | 1 | 2 | 3 | 4 | 5 | 6 | 7 | 8 | 9 | 10 | 11 | 12 | 13 | 14 | 15 | 16 |
|-------|---|---|---|---|---|---|---|---|---|----|----|----|----|----|----|----|
| Energy | 4 | 12 | 12 | 12 | 12 | 20 | 20 | 20 | 20 | 20 | 20 | 28 | 28 | 28 | 28 | 36 |
| Left Child Index | 1 | 1 | 1 | 2 | 3 | 1 | 4 | 2 | 2 | 3 | 3 | 2 | 3 | 4 | 4 | 4 |
| Right Child Index | 1 | 2 | 3 | 1 | 1 | 4 | 1 | 2 | 3 | 2 | 3 | 4 | 4 | 2 | 3 | 4 |

For example, when the two-dimensional symbol represented by Index 1 in Table 1 (referred to as the left child index) is combined with the two-dimensional symbol represented by Index 4 in Table 1 (referred to as the right child index), the resulting energy of the four-dimensional symbol is 20, which is represented by Index 6 in Table 2.

As will be described in more detail below, the LUTs 218 of Layer 2 may be programmed based on the contents of Table 2. Similarly, the LUTs 214 of Layer 3 may be programmed based on the 256 possible combinations of the 16 energy shells provided in Table 2. It is readily apparent that the programming required with each additional layer of the PCS encoding structure 200 may become prohibitively expensive. Thus, in order to reduce computation requirements, merging may be used to average energy shells which have equal or similar energies. For example, in determining the LUTs 218 of Layer 2, 1-bit merging may be used to transform the contents of Table 2 into the contents of Table 3. In other words, adjacent energy shells are paired, thereby transforming the 16 possible energy shells of Table 2 into 8 possible energy shells, indexed by 1 to 8.

TABLE 3

| Father Index | 1 | 2 | 3 | 4 | 5 | 6 | 7 | 8 |
|---|---|---|---|---|---|---|---|---|
| Energy | 8 | 12 | 16 | 20 | 20 | 24 | 28 | 32 |
| Left Child Index | 1 | 1 | 3 | 4 | 2 | 3 | 3 | 4 |
|  | 1 | 2 | 1 | 2 | 3 | 2 | 4 | 4 |
| Right Child Index | 1 | 3 | 1 | 1 | 3 | 3 | 4 | 3 |
|  | 2 | 1 | 4 | 2 | 2 | 4 | 2 | 4 |

The contents of Table 3 may form the basis of the LUT 218, which is illustrated in FIG. 4. For a single client bit that is input to the LUT 218, as denoted by arrow 402, two child indices are output: a left child index, denoted by arrow 406, and a right child index denoted by arrow 408. Each child index 406, 408 is two bits in length, so as to be able to represent all possible values in the LUT 218 (i.e., 1-4). The child indices 406, 408 may correspond to the child indices 219, 220, respectively, as illustrated in FIG. 2, which are the shaped bits that are used by the symbol selection 222 to generate the shaped symbols 203.

The values of the 2-bit child indices 406, 408 are determined by the value of client bit 402, as well as the value of a father index, denoted by 404. The father index 404 is three bits in length, so as to be able to represent all possible values of the energy shells in the LUT 218 (i.e., 1-8). The father index 404 may be received from a LUT in the next highest layer of the PCS encoding structure 200. In this example, the father index 404 is received from one of the LUTs 214 of Layer 3.

At Layer 3 of the PCS encoding structure 200, the LUTs 214 may be programmed by first determining the 64 possible combinations of energy shells resulting from the selection of two of the four-dimensional symbols described with respect to Layer 2. Since each four-dimensional symbol is based on a combination of two of the two-dimensional symbols of FIG. 3, Layer 3 may be referred to as the "four-symbol" layer. When two four-dimensional symbols are combined, the result may be referred to as an eight-dimensional symbol, since there are four I coordinates and four Q coordinates, for a total of eight coordinates. The 64 possible energy shells for the eight-dimensional symbols are provided in Table 4. These energy shells are indexed by 1 to 64.

TABLE 4

| Index | 1 | 2 | 3 | 4 | 5 | 6 | 7 | 8 | ... | 61 | 62 | 63 | 64 |
|---|---|---|---|---|---|---|---|---|---|---|---|---|---|
| Energy | 16 | 20 | 20 | 24 | 24 | 24 | 28 | 28 | ... | 56 | 60 | 60 | 64 |
| Left Child Index | 1 | 1 | 2 | 2 | 1 | 3 | 1 | 4 | ... | 7 | 7 | 8 | 8 |
| Right Child Index | 1 | 2 | 1 | 2 | 3 | 1 | 4 | 1 | ... | 7 | 8 | 7 | 8 |

2-bit merging may be used to transform the contents of Table 4 into the contents of Table 5. In other words, every four adjacent energy shells are combined, thereby transforming the 64 possible energy shells of Table 4 into 16 possible energy shells, indexed by 1 to 16.

TABLE 5

| Index | 1 | 2 | 3 | 4 | ... | 14 | 15 | 16 |
|---|---|---|---|---|---|---|---|---|
| Energy | 20 | 26 | 28 | 32 | ... | 52 | 52 | 60 |
| Left Child Index | 1 | 1 | 2 | 2 | ... | 6 | 5 | 7 |
|  | 1 | 3 | 3 | 4 | ... | 6 | 8 | 7 |
|  | 2 | 1 | 1 | 2 | ... | 4 | 6 | 8 |
|  | 2 | 4 | 5 | 5 | ... | 8 | 8 | 8 |
| Right Child Index | 1 | 3 | 3 | 4 | ... | 7 | 8 | 7 |
|  | 2 | 1 | 2 | 2 | ... | 6 | 5 | 8 |
|  | 1 | 4 | 5 | 5 | ... | 8 | 8 | 7 |
|  | 2 | 1 | 1 | 2 | ... | 4 | 6 | 8 |

In addition to the merging used to reduce computational requirements, clipping may be used to remove the highest energy shells from various LUTs, in order to achieve the desired shaping of the bits 203 that are output by the PCS encoding structure 200. For example, 1-bit clipping may be used to remove the 8 highest energy shells from Table 5, thereby resulting in Table 6.

TABLE 6

| Father Index | 1 | 2 | 3 | 4 | 5 | 6 | 7 | 8 |
|---|---|---|---|---|---|---|---|---|
| Energy | 20 | 26 | 28 | 32 | 33 | 36 | 37 | 40 |
| Left Child Index | 1 | 1 | 2 | 2 | 1 | 7 | 4 | 6 |
|  | 1 | 3 | 3 | 4 | 6 | 2 | 3 | 2 |
|  | 2 | 1 | 1 | 2 | 3 | 6 | 5 | 7 |
|  | 2 | 4 | 5 | 5 | 1 | 3 | 3 | 1 |
| Right Child Index | 1 | 3 | 3 | 4 | 6 | 1 | 3 | 3 |
|  | 2 | 1 | 2 | 2 | 1 | 6 | 5 | 7 |
|  | 1 | 4 | 5 | 5 | 3 | 2 | 3 | 2 |
|  | 2 | 1 | 1 | 2 | 7 | 4 | 6 | 8 |

The contents of Table 6 may form the basis of the LUT 214, which is illustrated in FIG. 5. For two client bits that are input to the LUT 214, as denoted by arrow 502, two child indices are output: a left child index, denoted by arrow 506, and a right child index denoted by arrow 508. Each child index 506, 508 is three bits in length, so as to be able to represent all possible values in the LUT 214 (i.e., 1-8). The child indices 506, 508 may correspond to the child indices 215, 216, respectively, as illustrated in FIG. 2, where each child index 215, 216 is used as a father index 404 for one of the LUTs 218 in Layer 2.

The values of the 3-bit child indices 506, 508 are determined by the values of client bits 502, as well as the value of a father index, denoted by 504. The father index 504 is three bits in length, so as to be able to represent all possible values of the energy shells in the LUT 214 (i.e., 1-8). The father index 504 may be received from a LUT in the next highest layer of the PCS encoding structure 200. In this example, the father index 504 is received from the LUT 210 of Layer 4.

At Layer 4 of the PCS encoding structure 200, the LUT 210 may be programmed by first determining the 64 possible combinations of energy shells resulting from the selection of two of the eight-dimensional symbols described with respect to Layer 3. When two eight-dimensional symbols are combined, the result may be referred to as a 16-dimensional symbol, since there are eight I coordinates and eight Q coordinates, for a total of 16 coordinates. The 64 possible energy shells for the 16-dimensional symbols are provided in Table 7. These energy shells are indexed by 1 to 64.

TABLE 7

| Index | 1 | 2 | 3 | 4 | 5 | 6 | 7 | 8 | ... | 61 | 62 | 63 | 64 |
|---|---|---|---|---|---|---|---|---|---|---|---|---|---|
| Energy | 40 | 46 | 46 | 48 | 48 | 52 | 52 | 52 | ... | 76 | 77 | 77 | 80 |
| Left Child Index | 1 | 1 | 2 | 1 | 3 | 1 | 2 | 4 | ... | 6 | 7 | 8 | 8 |
| Right Child Index | 1 | 2 | 1 | 3 | 1 | 4 | 2 | 1 | ... | 8 | 8 | 7 | 8 |

3-bit clipping may be used to remove the 56 highest energy shells from Table 7, thereby resulting in Table 8.

TABLE 8

| Father Index | 1 | 2 | 3 | 4 | 5 | 6 | 7 | 8 |
|---|---|---|---|---|---|---|---|---|
| Energy | 40 | 46 | 46 | 48 | 48 | 52 | 52 | 52 |
| Left Child Index | 1 | 1 | 2 | 1 | 3 | 1 | 2 | 4 |
| Right Child Index | 1 | 2 | 1 | 3 | 1 | 4 | 2 | 1 |

Figure 6:
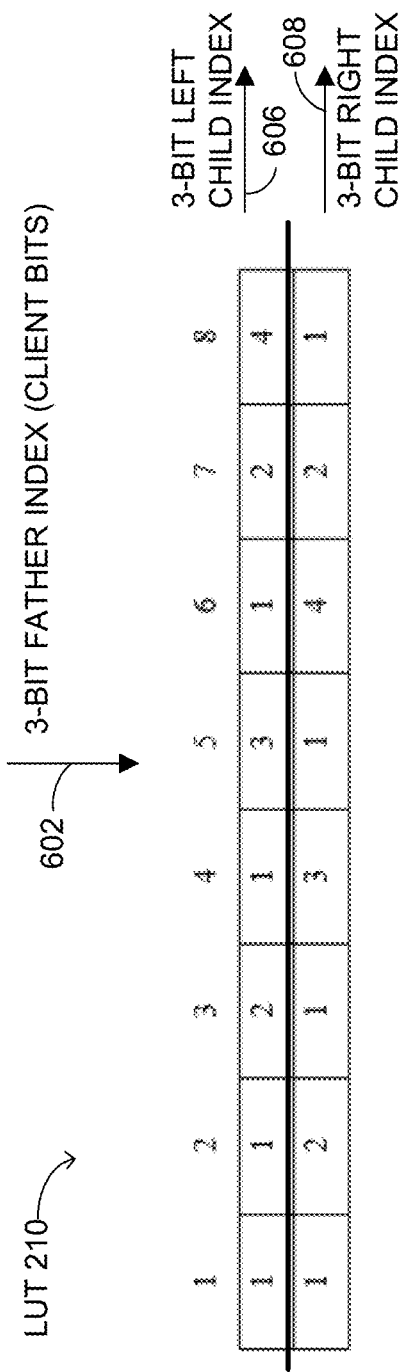
FIG. 6 illustrates an example LUT for a fourth layer of the PCS encoding structure of FIG. 2.

The contents of Table 8 may form the basis of the LUT 210, which is illustrated in FIG. 6. In contrast to the LUTs 214 and 218, the LUT 210 does not receive input from any higher layers, and therefore uses only client bits to determine the child indices. For example, the father index referred to Table 8 may be determined from client bits. Thus, for three client bits that are input to the LUT 210, as denoted by arrow 602, two child indices are output: a left child index, denoted by arrow 606, and a right child index denoted by arrow 608. Each child index 606, 608 should be at least two bits in length, so as to be able to represent all possible values in the LUT 210 (i.e., 1-4). The child indices 606, 608 may correspond to the child indices 211, 212, respectively, as illustrated in FIG. 2, where each child index 211, 212 is used as the father index 504 for one of the LUTs 214 in Layer 3. According to some examples, since the father index 504 of the LUTs 214 is three bits in length, the child indices 606 and 608 may be made the same length by setting the most significant bit equal to zero. This is illustrated in FIG. 6, where each child index 606, 608 has a length of three bits.

Once the LUTs 210, 214, 218 of the tree encoder have been programmed, the client bits 202 may be provided as input to the tree encoder. The client bits 202 may be used to index the LUTs 210, 214, and 218, as described above. The tree encoder may then output a long sequence of shaped bits 219, 220. The shaped bits 219, 220 may be mapped, together with the extra bits 204 (which are unshaped and may comprise additional client bits or FEC parity bits or both), to optical symbols in accordance with the symbol selection 222 and the quadrant selection 224 of Layer 1.

As a result of the highest energy shells being clipped at one or more layers of the tree encoder, the average energy ⟨E⟩ of the symbols output by the PCS encoding structure 200 may be reduced in a manner analogous to algebraic encoding. Referring to FIG. 3, the PCS encoding structure 200 will cause more of the client bits 202 to be mapped to the symbol which corresponds to the constellation point having Index 1 than to the symbol which corresponds to the constellation point having Index 4. In other words, constellation points in Quadrant I will have non-uniform visitation probabilities, with the Index-1 point having the highest visitation probability, the Index-4 point having the lowest visitation probability, and the Index-2 and Index-3 points having intermediate visitation probabilities. The quadrant selection 224 uses the unshaped extra bits 204 to propagate the visitation probabilities of Quadrant I to Quadrants II, III, and IV, such that the constellation points closer to the origin have higher visitation probabilities than the constellation points further from the origin.

Unlike algebraic encoding, practical limitations on the size of the LUTs of the tree structure may result in temporal correlations between symbols. These temporal correlations tend to reduce performance by limiting the achievable data rate in a linear AWGN channel. However, temporal correlations induced by tree encoding have also been observed to significantly improve nonlinear propagation performance. Accordingly, there may be advantages to using tree encoding for PCS.

In order for an optical receiver to recover the original client bits 202 and the extra bits 204 from the shaped symbols 205, the optical receiver may receive information about the programming of the LUTs 210, 214, and 218. The optical receiver may implement tree decoding that effectively reverses the tree encoding performed at the optical transmitter.

Figure 7:
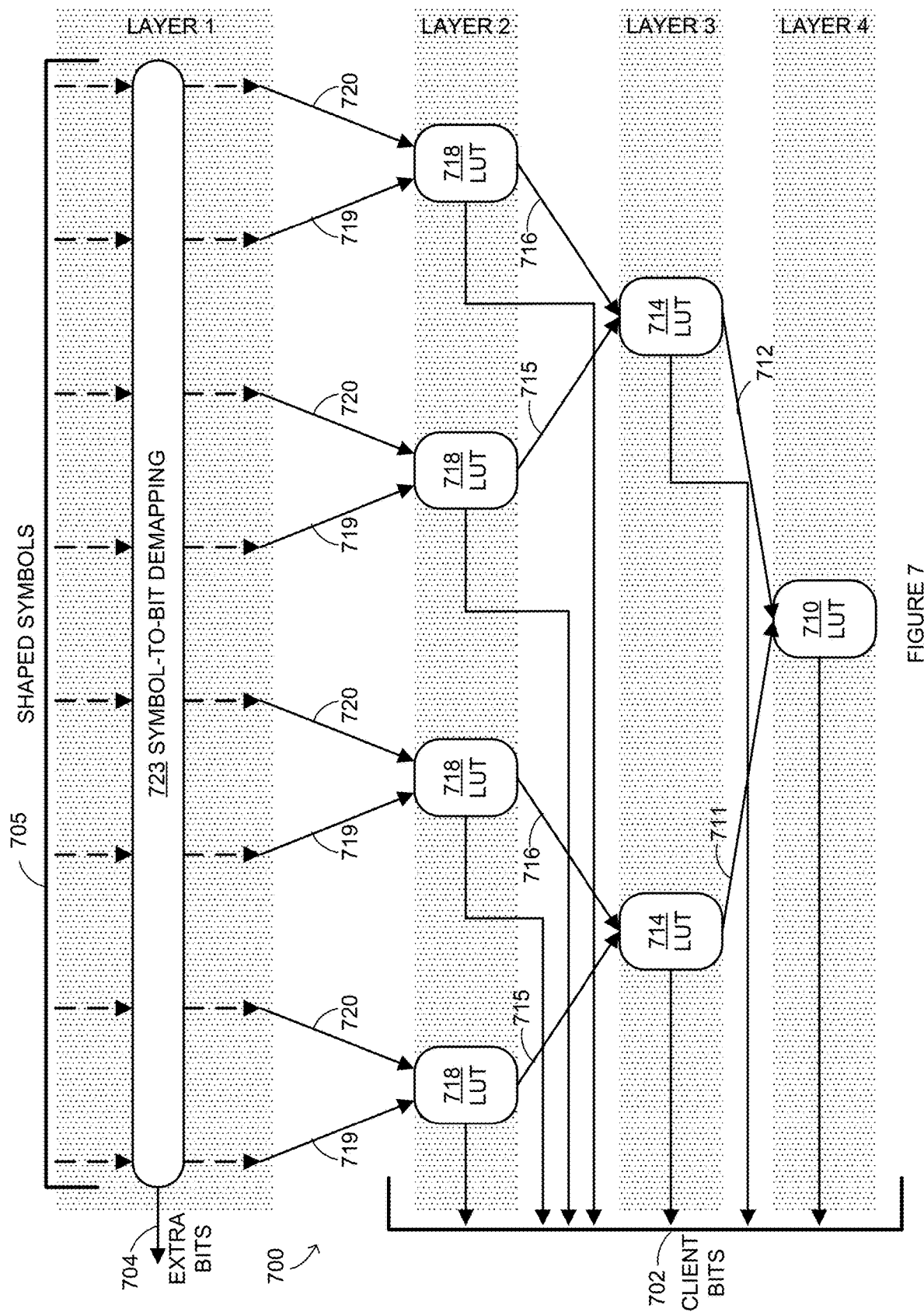
FIG. 7 illustrates a schematic of an example PCS decoding structure for use with the PCS encoding structure of FIG. 2.

FIG. 7 illustrates a schematic of an example PCS decoding structure 700, for use with the PCS encoding structure 200 of FIG. 2. The PCS decoding structure 700 may reverse the actions of the PCS encoding structure 200, in order to recover unshaped client bits 702 and unshaped extra bits 704 from shaped symbols 705.

The PCS decoding structure 700 corresponds to the PCS encoding structure 200, and therefore also comprises four layers. Layers 2, 3, and 4 of the PCS decoding structure 700 correspond to a tree decoding structure (also referred to herein as a "tree decoder"), which receives the shaped bits 719, 720 as input, and outputs unshaped client bits 702.

At Layer 1 of the PCS decoding structure 700, symbol-to-bit demapping 723 may be applied to the shaped symbols 705. For the purposes of the following example, it may be assumed that the shaped symbols 705 are identical to the shaped symbols 205 that were generated at the optical transmitter. However, in general, the shaped symbols 705 may be estimates of the shaped symbols 205, the estimates having been determined from a degraded version of an optical signal transmitted from the optical transmitter to the optical receiver. The use of FEC decoding in conjunction with tree decoding will be described further with respect to FIG. 9. The symbol-to-bit demapping 723 may first involve determining the bits of the shaped symbols 705 that were used to represent the quadrant, according to the quadrant selection 224. These bits, denoted by 704, correspond to the extra bits 204. The symbol-to-bit demapping 723 may then involve determining shaped bits 719, 720 from the remaining non-quadrant bits of the shaped symbols 705.

At Layer 2 of the PCS decoding structure 700, the shaped bits 719, 720 may be input into LUTs 718. The programming of the LUTs 718 is based on the programming of the LUTs 218, such that the encoding achieved by the LUTs 218 at the optical transmitter is reversed by the decoding achieved by the LUTs 718 at the optical receiver. For example, the decoding achieved by each of the LUTs 718 may be understood by reversing the directions of the arrows 402, 404, 406, and 408 applied to the LUT 218 in FIG. 4. The shaped bits 719, 720 input to the LUTs 718 are 2-bit left child indices and 2-bit right child indices, where it may be assumed that the left bit of each index is the most significant bit, and the right bit is the least significant bit. The LUTs 718 provide two kinds of outputs: client bits 702 and 3-bit father indices, denoted by 715, 716.

Table 9 illustrates the contents of each LUT 718. There are 16 different combinations of left child indices and right child indices.

TABLE 9

| Left Child Index | 1 | 1 | 1 | 1 | 2 | 2 | 2 | 2 | 3 | 3 | 3 | 3 | 4 | 4 | 4 | 4 |
|---|---|---|---|---|---|---|---|---|---|---|---|---|---|---|---|---|
| Right Child Index | 1 | 2 | 3 | 4 | 1 | 2 | 3 | 4 | 1 | 2 | 3 | 4 | 1 | 2 | 3 | 4 |
| Father Index | 1 | 1 | 2 | 3 | 2 | 4 | 5 | 6 | 3 | 5 | 6 | 7 | 4 | 7 | 8 | 8 |
| Client bit | 0 | 1 | 0 | 1 | 1 | 1 | 0 | 1 | 0 | 1 | 0 | 0 | 0 | 1 | 0 | 1 |

At Layer 3 of the PCS decoding structure 700, the bits 715, 716 may be input into LUTs 714. The programming of the LUTs 714 is based on the programming of the LUTs 214, such that the encoding achieved by the LUTs 214 at the optical transmitter is reversed by the decoding achieved by the LUTs 714 at the optical receiver. For example, the decoding achieved by each of the LUTs 714 may be understood by reversing the directions of the arrows 502, 504, 506, and 508 applied to the LUT 214 in FIG. 5. Thus, the bits 715, 716 input to the LUTs 714 are 3-bit left child indices and 3-bit right child indices. The LUTs 714 provide two kind of outputs: client bits 702 and 3-bit father indices, denoted by 711, 712.

Table 10 illustrates the contents of each LUT 714. There are 64 different combinations of left child indices and right child indices. For clarity, Table 10 illustrates these 64 combinations in 4 rows and 16 columns. The respective father indices and client bits corresponding to the 64 combinations of left child indices and right child indices are also shown in 4 rows and 16 columns. The letter N denotes an entry that is not selected, as a result of clipping. For example, in the case where the left child index is 2 and the right child index is 8, the corresponding father index and client bits are denoted by the letter N. This is because the particular combination of (2,8) for the left and right child indices is never realized as a result of the 3-bit clipping that resulted in the contents of Table 8, which forms the basis of the LUT 210.

At Layer 4 of the PCS decoding structure 700, the bits 711, 712 may be input into LUT 710. The programming of the LUT 710 is based on the programming of the LUT 210, such that the encoding achieved by the LUT 210 at the optical transmitter is reversed by the decoding achieved by the LUT 710 at the optical receiver. For example, the decoding achieved by the LUT 710 may be understood by reversing the direction of the arrows 602, 606, and 608 applied to the LUT 210 in FIG. 6. Thus, the bits 711, 712 input to the LUT 710 are 3-bit left child indices and 3-bit right child indices (where the most significant bit is zero, as described previously). The LUT 710 provides three client bits 702 as output.

Table 11 illustrates the contents of the LUT 710. There are 64 different combinations of left child indices and right child indices. For clarity, Table 11 illustrates these 64 combinations in 4 rows and 16 columns. The client bits corresponding to the 64 combinations of left child indices and right child indices are also shown in 4 rows and 16 columns. Each entry denoted by the letter N corresponds to a combination of left child index and right child index that is never selected. These combinations are effectively disallowed as a result of the tree programming used for Table 8, which forms the basis of the LUT 210 used at the optical transmitter. There are only eight allowed combinations of left child indices and right child indices in Table 11, corresponding to the eight combinations provided in Table 8.

TABLE 11

| Left Child Index, Right Child Index | 1,1 | 1,2 | 1,3 | 1,4 | 1,5 | 1,6 | 1,7 | 1,8 | 2,1 | 2,2 | 2,3 | 2,4 | 2,5 | 2,6 | 2,7 | 2,8 |
|---|---|---|---|---|---|---|---|---|---|---|---|---|---|---|---|---|
| | 3,1 | 3,2 | 3,3 | 3,4 | 3,5 | 3,6 | 3,7 | 3,8 | 4,1 | 4,2 | 4,3 | 4,4 | 4,5 | 4,6 | 4,7 | 4,8 |
| | 5,1 | 5,2 | 5,3 | 5,4 | 5,5 | 5,6 | 5,7 | 5,8 | 6,1 | 6,2 | 6,3 | 6,4 | 6,5 | 6,6 | 6,7 | 6,8 |
| | 7,1 | 7,2 | 7,3 | 7,4 | 7,5 | 7,6 | 7,7 | 7,8 | 8,1 | 8,2 | 8,3 | 8,4 | 8,5 | 8,6 | 8,7 | 8,8 |
| Client bits | 000 | 001 | 011 | 101 | N | N | N | 010 | 110 | N | N | N | N | N | N | N |
| | 100 | N | N | N | N | N | N | 111 | N | N | N | N | N | N | N | N |
| | N | N | N | N | N | N | N | N | N | N | N | N | N | N | N | N |
| | N | N | N | N | N | N | N | N | N | N | N | N | N | N | N | N |

In U.S. Pat. No. 6,313,932 entitled "Multiplexed Transmission of Optical Signals" (2001), Roberts et al. describe transmitting a train of optical pulses which are multiplexed by wavelength division multiplexing (WDM) to provide a large number of channels.

Frequency division multiplexing (FDM) may be used to digitally divide up the modulated optical spectrum into a plurality of subcarriers, each with a different center frequency, such that each subcarrier may be used to transmit a signal that is representative of a different stream of symbols. In this manner, a plurality of symbol streams may be simultaneously communicated, in parallel, over the optical communication channel. FDM is possible when the frequencies of the subcarriers are sufficiently separated that the

TABLE 10

| Left Child Index, Right Child Index | 1,1 | 1,2 | 1,3 | 1,4 | 1,5 | 1,6 | 1,7 | 1,8 | 2,1 | 2,2 | 2,3 | 2,4 | 2,5 | 2,6 | 2,7 | 2,8 |
|---|---|---|---|---|---|---|---|---|---|---|---|---|---|---|---|---|
| | 3,1 | 3,2 | 3,3 | 3,4 | 3,5 | 3,6 | 3,7 | 3,8 | 4,1 | 4,2 | 4,3 | 4,4 | 4,5 | 4,6 | 4,7 | 4,8 |
| | 5,1 | 5,2 | 5,3 | 5,4 | 5,5 | 5,6 | 5,7 | 5,8 | 6,1 | 6,2 | 6,3 | 6,4 | 6,5 | 6,6 | 6,7 | 6,8 |
| | 7,1 | 7,2 | 7,3 | 7,4 | 7,5 | 7,6 | 7,7 | 7,8 | 8,1 | 8,2 | 8,3 | 8,4 | 8,5 | 8,6 | 8,7 | 8,8 |
| Father Index | 1 | 1 | 2 | 2 | 3 | 5 | 5 | 8 | 1 | 1 | 3 | 4 | 4 | 6 | 8 | N |
| | 2 | 3 | 5 | 6 | 7 | 7 | N | N | 2 | 4 | 7 | N | N | N | N | N |
| | 3 | 4 | 7 | N | N | N | N | N | 5 | 6 | 8 | N | N | N | N | N |
| | 6 | 8 | N | N | N | N | N | N | N | N | N | N | N | N | N | N |
| Client bits | 00 | 01 | 00 | 10 | 10 | 00 | 11 | 11 | 10 | 11 | 00 | 00 | 10 | 01 | 01 | N |
| | 01 | 01 | 10 | 11 | 01 | 11 | N | N | 11 | 01 | 00 | N | N | N | N | N |
| | 11 | 11 | 10 | N | N | N | N | N | 01 | 10 | 00 | N | N | N | N | N |
| | 00 | 10 | N | N | N | N | N | N | N | N | N | N | N | N | N | N | bandwidths of the signals do not significantly overlap. Each different subcarrier corresponds to a different FDM channel.

Orthogonal FDM uses numerous closely spaced orthogonal subcarrier signals with overlapping spectra to carry data. In United States Patent Application Publication No. 2005/0074037 entitled "Optical Sub-Carrier Multiplexed Transmission" (2005), Rickard et al. describe the use of a Discrete Fourier Transform (DFT) to create OFDM subcarriers for optical transmission. In "Coherent Optical 25.8-Gb/s OFDM Transmission Over 4160-km SSMF", *Journal of Lightwave Technology*, Vol. 26, Issue 1, pp. 6-15 (2008), Jansen et al. describe the use of a cyclic prefix to tolerate chromatic dispersion of optical OFDM.

Figure 8:
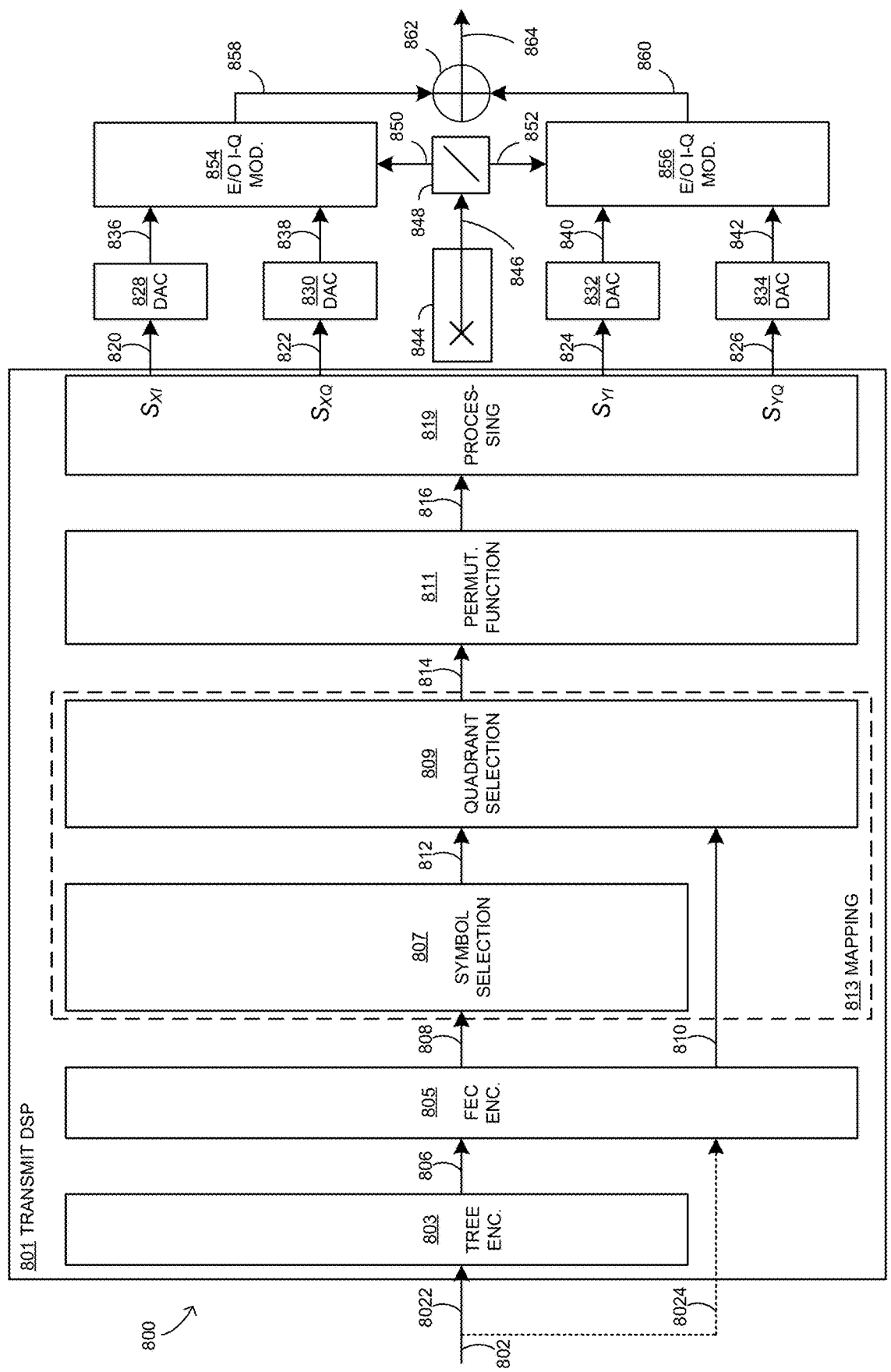
FIG. 8 illustrates an example optical transmitter in accordance with the technology disclosed herein.

FIG. 8 is a block diagram illustration of an example optical transmitter section 800 of an optical transceiver ("optical transmitter 800"), in accordance with examples of the technology disclosed herein.

The optical transmitter 800 is operative to transmit an optical signal 864 which is representative of client bits 802. The optical transmitter 800 employs polarization-division multiplexing (PDM). In other examples (not shown), generation of the optical signal 864 may involve alternative techniques, such as single polarization modulation, modulation of an unpolarized carrier, mode-division multiplexing, spatial-division multiplexing, Stokes-space modulation, polarization balanced modulation, and the like. A laser 844 is operative to generate a continuous wave (CW) optical carrier 846. A polarizing beam splitter 848 is operative to split the CW optical carrier 846 into orthogonally-polarized components 850, 852 that are modulated by respective electrical-to-optical modulators 854, 856 to produce modulated polarized optical signals 858, 860 that are combined by a beam combiner 862, thus yielding the optical signal 864. In some examples (not shown), the locations of the polarizing beam splitter 848 and the beam combiner 862 may be reversed. In some examples (not shown), the polarizing beam splitter 848 and the beam combiner 862 may be replaced with simple power splitters and combiners.

The optical transmitter 800 comprises a transmit digital signal processor (DSP) 801. The transmit DSP 801 may be operative to apply processing 819 to M parallel streams of symbols 816 corresponding to M respective FDM subcarriers. The processing 819 may comprise digital up-sampling of the symbols 816. The processing 819 may further comprise operations that are subsequently applied to the sampled waveform, either in the time domain or the frequency domain. Such operations may include pulse shaping, FDM subcarrier multiplexing, chromatic dispersion precompensation, and distortion precompensation. The processing 819 may include the application of one or more filters, which may involve the application of one or more Fast Fourier Transforms (FFTs) and one or more corresponding inverse FFTs (IFFTs).

Based on the symbols 816 and a selected modulation scheme, the transmit DSP 801 may be operative to generate four digital drive signals at each particular time interval, t, corresponding to the four dimensions XI, XQ, YI, YQ. The processing 819 may result in output signals 820, 822, 824, 826, which comprise an electrical representation of the optical spectrum, where the total bandwidth of the optical spectrum is denoted by W, and the bandwidth of each FDM subcarrier is denoted by W/M. The output signals 820, 822, 824, 826 are the digital drive signals corresponding to the four dimensions XI, XQ, YI, YQ of the entire multiplexed super-channel. For example, the digital drive signals 820, 822 may correspond to the I and Q components, respectively, of the X polarization, while the digital drive signals 824, 826 may correspond to the I and Q components, respectively, of the Y polarization. According to this example, at the time interval, t, the digital drive signals 820, 822 may be denoted $S_{XI}(t)$, $S_{XQ}(t)$, respectively, while digital drive signals 824, 826 may be denoted $S_{YI}(t)$, $S_{YQ}(t)$, respectively.

The optical transmitter 800 comprises a plurality of digital-to-analog converters (DACs) 828, 830, 832, 834 which respectively may be used to convert the digital drive signals 820, 822, 824, 826 into respective analog drive signals. For example, the digital drive signals 820, 822 may be input to DACs 828, 830, respectively, to produce I and Q analog drive signals 836, 838. The digital drive signals 824, 826 may be input to DACs 832, 834, respectively, to produce I and Q analog drive signals 840, 842. The analog drive signals 836, 838 are used to drive the electrical-to-optical modulator 854, and the analog drive signals 840, 842 are used to drive the electrical-to-optical modulator 856, which ultimately results in the optical signal 864.

The transmit DSP 801 may be operative to apply PCS encoding to at least a portion 8022 of the client bits 802, in order to generate shaped bits. A remaining portion 8024 of the client bits 802 may remain unshaped. In the example optical transmitter 800, the PCS encoding is implemented using tree encoding 803. The tree encoding 803 may output a sequence of shaped bits 806, based on a plurality of programmable LUTs available at the optical transmitter 800. For example, with reference to FIG. 2, the bits 8022 may correspond to the client bits 202, the tree encoding 803 may correspond to Layers 2-4 of the PCS encoding structure 200, and the shaped bits 806 may correspond to the shaped bits 219, 220.

According to some examples, the LUTs may reside in or be implemented in hardware of the optical transmitter 800, while the contents of the LUTs may be programmable by firmware of the optical transmitter 800. In one example, the firmware may control programming of the LUTs for different data rates, for example, if the optical transmitter 800 switches from a transmission mode of 400 Gbps to 600 Gbps.

The transmit DSP 801 may be operative to apply FEC encoding 805 to the shaped bits 806 output by the tree encoding 803, and also to the unshaped bits 8024, if they exist. The FEC encoding 805 may be systematic. One portion 808 of the output of the FEC encoding 805 may comprise the shaped bits 806, while a remaining portion 810 of the output of the FEC encoding 805 may comprise the parity bits generated by the FEC encoding 805, as well as the unshaped bits 8024, if they exist. Symbol selection 807 may be applied to the portion 808 to generate shaped symbols 812. This may correspond, for example, to the application of the symbol selection 222 to the shaped bits 219, 220 to generate the shaped symbols 203, as described with respect to FIG. 2. The portion 810, which includes the parity added by the FEC encoding 805, as well as the unshaped bits 8024, if they exist, may be used to apply quadrant selection 809 to the shaped symbols 812, thereby generating shaped symbols 814. This may correspond, for example, to the application of the quadrant selection 224 to the shaped symbols 203 and the client bits 204 to generate the shaped symbols 205, as described with respect to FIG. 2. Together, the symbol selection 807 and the quadrant selection 809 may generally be referred to as mapping 813.

When PCS encoding is implemented using tree encoding, such as the tree encoding 803, the PCS encoding may induce temporal correlations in the energy of encoded optical symbols. These temporal correlations have been found to be advantageous in terms of reducing nonlinear interference on many fiber applications. This nonlinear benefit may improve the net system margin by ~1 dB on low net dispersion systems, relative to algebraic encoding or CAP encoding. When used in a FDM system, tree encoding may be implemented by programming a separate tree encoder for each FDM subcarrier. While temporal correlations are still induced by each tree encoder, the resulting nonlinear advantage may decrease as the number of FDM subcarriers increases.

Instead of applying a separate tree encoder for each FDM subcarrier, it is herein proposed that a single tree encoder be used to encode data across a plurality of FDM subcarriers, such that the tree encoder is programmed for time encoding and frequency encoding. Shaped symbols output from a single tree encoder may be encoded across a plurality of FDM subcarriers. A permutation function, available at the optical transmitter, may control precisely how the shaped symbols are to be mapped to the various FDM subcarriers. In FIG. 8, the permutation function is denoted by 811 and is applied to the shaped symbols 814 in order to generate the shaped symbols 816. The shaped symbols 814 may comprise a serial stream of symbols, whereas the shaped symbols 816 may comprise M parallel streams of symbols corresponding to the M FDM subcarriers. The shaped symbols 816 may comprise a reordered or rearranged version of the shaped symbols 814, where the reordered version is designed to achieve a desired mapping of shaped symbols 814 to the plurality of FDM subcarriers.

Numerous permutation functions are contemplated.

According to some examples, a permutation function may be programmed to cause long blocks of consecutive shaped symbols to be mapped to a single FDM subcarrier. For example, a large set of shaped symbols may be divided into a plurality of subsets, where each subset consists of a long block of consecutive shaped symbols. The permutation function may be programmed to cause a first subset to be encoded on a first FDM subcarrier, to cause a second subset to be encoded on a second FDM subcarrier, and so on. Given the temporal correlations in shaped symbols resulting from tree encoding, this programming of the permutation function may be used to realize time encoding, which may be advantageous for high net dispersion systems, as described previously. For this case (high net dispersion), performance may be similar to that of existing solutions, but it is implemented by just one tree for all FDM subcarriers.

According to another example, a permutation function may be programmed to cause consecutive shaped symbols to be mapped to different FDM subcarriers. For example, given a set of consecutive shaped symbols $V_1, V_2, V_3, V_4, \ldots, V_N$ which are to be encoded across two FDM subcarriers (denoted "FDM 1" and "FDM 2"), the permutation function may be programmed to cause symbol $V_1$ to be mapped to FDM 1 at time $t_1$, to cause symbol $V_2$ to be mapped to FDM 2 at time $t_1$, to cause symbol $V_3$ to be mapped to FDM 1 at time $t_2$, to cause symbol $V_4$ to be mapped to FDM 2 at time $t_2$, and so on. Similarly to the previous example, each FDM subcarrier will encode a different subset of the set of consecutive shaped symbols generated by the PCS encoding. However, in contrast to the previous example, each subset comprises non-consecutive shaped symbols within the set. For example, the non-consecutive symbols $V_1$ and $V_3$ are encoded on FDM 1, while the non-consecutive symbols $V_2$ and $V_4$ are encoded on FDM 2. In addition to the temporal correlations in the shaped symbols which may result from tree encoding, this programming of the permutation function correlates symbol energies across FDM subcarriers, thereby realizing time-frequency encoding, which may be advantageous for low net dispersion metro systems or dispersion compensated submarine systems. The correlation introduced by tree encoding may be exploited to realize nonlinear propagation benefits by encoding data across multiple FDM subcarriers.

The permutation function 811 may reside in or be implemented in hardware of the optical transmitter 800. According to some examples, the permutation function 811 may be programmable through firmware of the optical transmitter 800. According to other examples, a plurality of different permutation functions 811 may be pre-calculated and implemented in hardware of the optical transmitter 800, such that they may be cycled through in order to locate a desired mapping. According to other examples, the outputs of the tree nodes may be hard-wired directly to the appropriate FDM subcarriers. Such examples would render the permutation function 811 unnecessary, but would limit the flexibility to handle different fiber applications.

According to some examples (not shown), the PCS encoding applied at the optical transmitter 800 may be implemented using algebraic encoding, instead of tree encoding. For example, the tree encoding 803 may be replaced by algebraic encoding, such as that described by Oveis Gharan et al. in U.S. Pat. No. 9,698,939.

Together, the PCS encoding structure (represented in FIG. 8 by the tree encoding 803, the symbol selection 807, and the quadrant selection 809) and the permutation function 811 may be programmed based on one or more properties of the optical communication link over which the optical signal is transmitted. The properties may include, for example, net dispersion of the link, type of optical fiber in each span of the link, net dispersion as a function of distance (the dispersion map), signal bandwidth of the current channel and number of subcarriers, and possibly, the current channel's optical power as a function of distance. According to some examples, the PCS encoding structure and the permutation function 811 may be reprogrammed based on changes in one or more properties of the optical communication link. According to some examples, the PCS encoding structure and the permutation function 811 may be programmed to achieve different capacities on different FDM subcarriers.

According to some examples, the transmit DSP 801 may implement one or more of the PCS encoding (such as the tree encoding 803), the FEC encoding 805, the mapping 813 (such as the symbol selection 807 and the quadrant selection 809), the permutation function 811, and the symbol processing 819 by executing computer-executable instructions or code stored in a memory of the optical transmitter 800.

The optical transmitter 800 may comprise additional components that are not described in this document.

Figure 9:
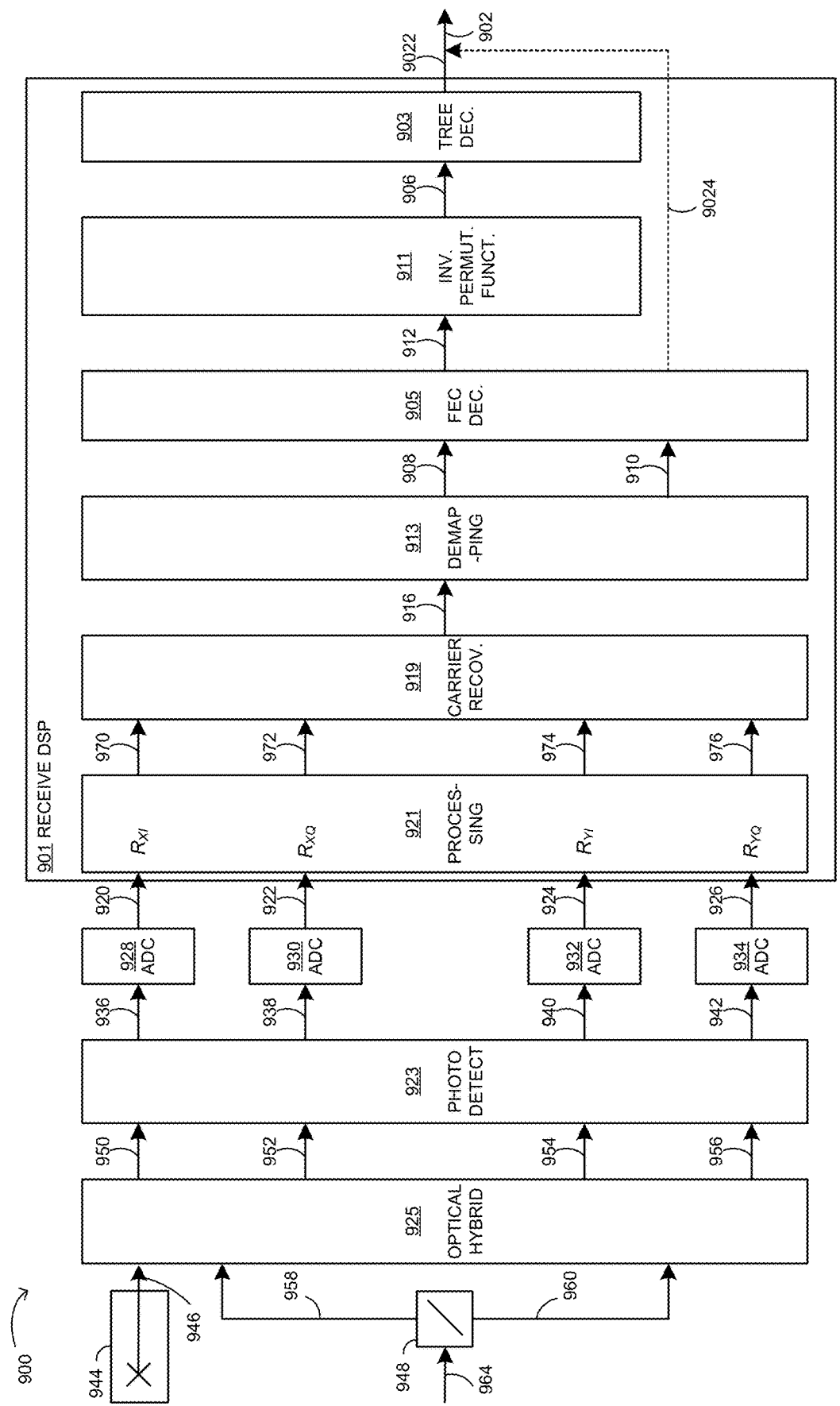
FIG. 9 illustrates an example optical receiver in accordance with the technology disclosed herein.

FIG. 9 is a block diagram illustration of an example optical receiver section 900 of an optical transceiver ("optical receiver 900"), in accordance with examples of the technology disclosed herein.

The optical receiver 900 may be operative to recover corrected bits 902 from a received optical signal 964, where the bits 902 may comprise estimates of client bits intended for communication by an optical transmitter to the optical receiver 900 over an optical communication link. For example, the received optical signal 964 may comprise a degraded version of the optical signal 864 generated by the optical transmitter 800, where the degradations in the received optical signal 964 may have been caused, for example, by one or more of noise, nonlinear effects, PDL or PDG, and imperfections in analog signal processing performed at the optical transmitter 800. A polarizing beam splitter 948 is operative to split the received optical signal 964 into orthogonally-polarized components 958, 960. An optical hybrid 925 is operative to process the components 958, 960 with respect to an optical signal 946 produced by a laser 944. Photodetectors 923 are operative to convert the outputs 950, 952, 954, 956 of the optical hybrid 925 to received analog signals 936, 938, 940, 942, respectively. The four received analog signals correspond to the four dimensions XI, XQ, YI, YQ at a particular time interval, t.

The optical receiver 900 comprises analog-to-digital converters (ADCs) 928, 930, 932, 934 which are operative to sample the received analog signals 936, 938, 940, 942, respectively, and to generate received digital signals 920, 922, 924, 926, respectively. In one example, the received analog signals 936, 938 may correspond to the I and Q components, respectively, of the X polarization, while the received analog signals 940, 942 may correspond to the I and Q components, respectively, of the Y polarization. According to this example, at the time interval, t, the received digital signals 920, 922 may be denoted $R_{XI}(t)$, $R_{XQ}(t)$, respectively, while the received digital signals 924, 926 may be denoted $R_{YI}(t)$, $R_{YQ}(t)$, respectively.

The optical receiver 900 comprises a receive DSP 901.

The receive DSP 901 may be operative to apply processing 921 to the digital signals 920, 922, 924, 926 in order to derive respective digital signals 970, 972, 974, 976. The processing 921 may include the application of one or more filters to the digital signals 920, 922, 924, 926, which may involve the application of one or more FFTs and one or more corresponding IFFTs. The processing 921 may also include FDM subcarrier de-multiplexing, chromatic dispersion post-compensation, distortion post-compensation, and sampling. As a result of the FDM subcarrier de-multiplexing applied at 921, the symbol estimates 970, 972, 974, 976 may comprise M parallel streams of symbol estimates corresponding to M FDM subcarriers. The symbol estimates 970, 972, 974, 976 may subsequently undergo carrier phase recovery or other symbol-based operations, as denoted by 919, which results in symbol estimates 916.

The receive DSP 901 may be operative to apply demapping 913 to the symbol estimates 916 in order to derive bit estimates 908 and 910. The bit estimates 908 may correspond to estimates of bits 808, which correspond to the shaped bits 806 generated by the tree encoding 803. The bit estimates 910 may correspond to estimates of the bits 810, which include the parity bits generated by the FEC encoding 805, as well as the unshaped bits 8024, if they exist. A bit estimate may comprise a binary value, or may comprise a confidence value, such as log-likelihood ratio. In the case of a binary-valued variable (i.e., a bit), its log-likelihood ratio (LLR) is defined as the logarithm of the ratio of the probability of the bit being equal to one to the probability of the bit being equal to zero. For example, for a bit b, $$LLR(b) = \log\left(\frac{P(b=1)}{P(b=0)}\right),$$

where P denotes probability. For non-binary-valued variables, such as a set of integers, other metrics could be used, such as the logarithm of the probability of a given integer value divided by the sum of the probabilities of the other possible integer values, for example.

The receive DSP 901 may be operative to apply FEC decoding 905 to the bit estimates 908, 910 in order to recover corrected bits 912, 9024. The FEC decoding 905 may comprise hard-decision decoding or soft-decision decoding. One example of soft-decision decoding is Maximum Likelihood (ML) decoding. Where the optical receiver 900 is compatible with the optical transmitter 800, the FEC decoding 905 and the FEC encoding 805 will correspond to the same FEC scheme. If the FEC decoding 905 is able to correct all errors present in the FEC-encoded bit estimates 908, 910, then the corrected bits 912 will be identical to the shaped bits 806, and the corrected bits 9024 will be identical to the original client bits 8024, if they exist. If the FEC decoding 905 is unable to correct all errors present in the FEC-encoded bit estimates 908, 910, then the corrected bits 912 will differ from the shaped bits 806, or the corrected bits 9024 will differ from the original client bits 8024, or both. In this case, the FEC scheme implemented by the FEC encoding 805 and FEC decoding 905 may be considered to have failed.

The receive DSP 901 may be operative to implement an inverse permutation function 911 available at the optical receiver 900 in order reverse the effect of a permutation function applied at a corresponding optical transmitter, such as the permutation function 811. According to the example illustrated in FIG. 9, the inverse permutation function 911 is applied to the corrected bits 912 output by the FEC decoding 905. The inverse permutation function 911 outputs bits 906, which are a reordered version of the corrected bits 912. The reordered bits 906 output by the inverse permutation function 911 are in the correct order to be mapped to the appropriate nodes of tree decoding 903.

The inverse permutation function 911 may reside in or be implemented in hardware of the optical receiver 900. According to some examples, the inverse permutation function 911 may be programmable through firmware of the optical receiver 900.

By applying the inverse permutation function 911 after the FEC decoding 905, it is possible to independently decode data from each FDM subcarrier in the symbol demapping 913, thereby addressing scenarios in which different FDM subcarriers are shaped to have different capacities.

However, according to other examples (not shown), the inverse permutation function 911 may be applied after the demapping 913, but prior to the FEC decoding 905. Since the location of bits in the FEC de-interleaver is known, the inverse permutation function 911 may be applied to the bit estimates 908 before the FEC decoding 905 by mapping symbols to known locations such that, after the FEC decoding 905, the bits are provided to the correct tree node.

The tree decoding 903 may be implemented by applying the inverse of the tree encoding 803. The tree decoding 903 may be implemented using a plurality of programmable LUTs available at the optical receiver 900. According to some examples, the LUTs may reside in or be implemented in hardware of the optical receiver 900, while the contents of the LUTs may be programmable by firmware of the optical receiver 900. Application of the tree decoding 903 to the bits 906 results in corrected bits 9022. Together, the corrected bits 9022, 9024 form corrected bits 902. With reference to FIG. 7, the shaped bits 906 may correspond to the shaped bits 719, 720, the tree decoding 903 may correspond to Layers 2-4 of the PCS decoding structure 700, and the bits 9022 may correspond to the client bits 702. Where the FEC scheme has successfully corrected all errors, the corrected bits 9022 will be identical to the client bits 8022, while the corrected bits 902 will be identical to the client bits 802.

According to some examples (not shown), where the PCS encoding applied at the optical transmitter 800 has been implemented using algebraic encoding instead of tree encoding, the PCS decoding applied at the optical receiver 900 will be implemented using algebraic decoding, instead of tree decoding. For example, the tree decoding 903 may be replaced by algebraic decoding, such as that described by Oveis Gharan et al. in U.S. Pat. No. 9,698,939.

According to some examples, the receive DSP 901 may implement one or more of the PCS decoding (such as the tree decoding 903), the inverse permutation function 911, the FEC decoding 905, the demapping 913, and the symbol processing 919 by executing computer-executable instructions or code stored in a memory of the optical receiver 900.

The optical receiver 900 may comprise additional components that are not described in this document.

It should be understood that, when certain programming changes are applied at an optical transmitter, corresponding changes may be applied at the optical receiver. For example, in order to maintain compatibility between the optical transmitter 800 and the optical receiver 900, reprogramming of the PCS encoding structure and/or the permutation function 811 at the optical transmitter 800 (for example, to reflect changes in link conditions) should be accompanied by corresponding reprogramming of the PCS decoding structure and/or the inverse permutation function 911 at the optical receiver 900.

Figure 10:
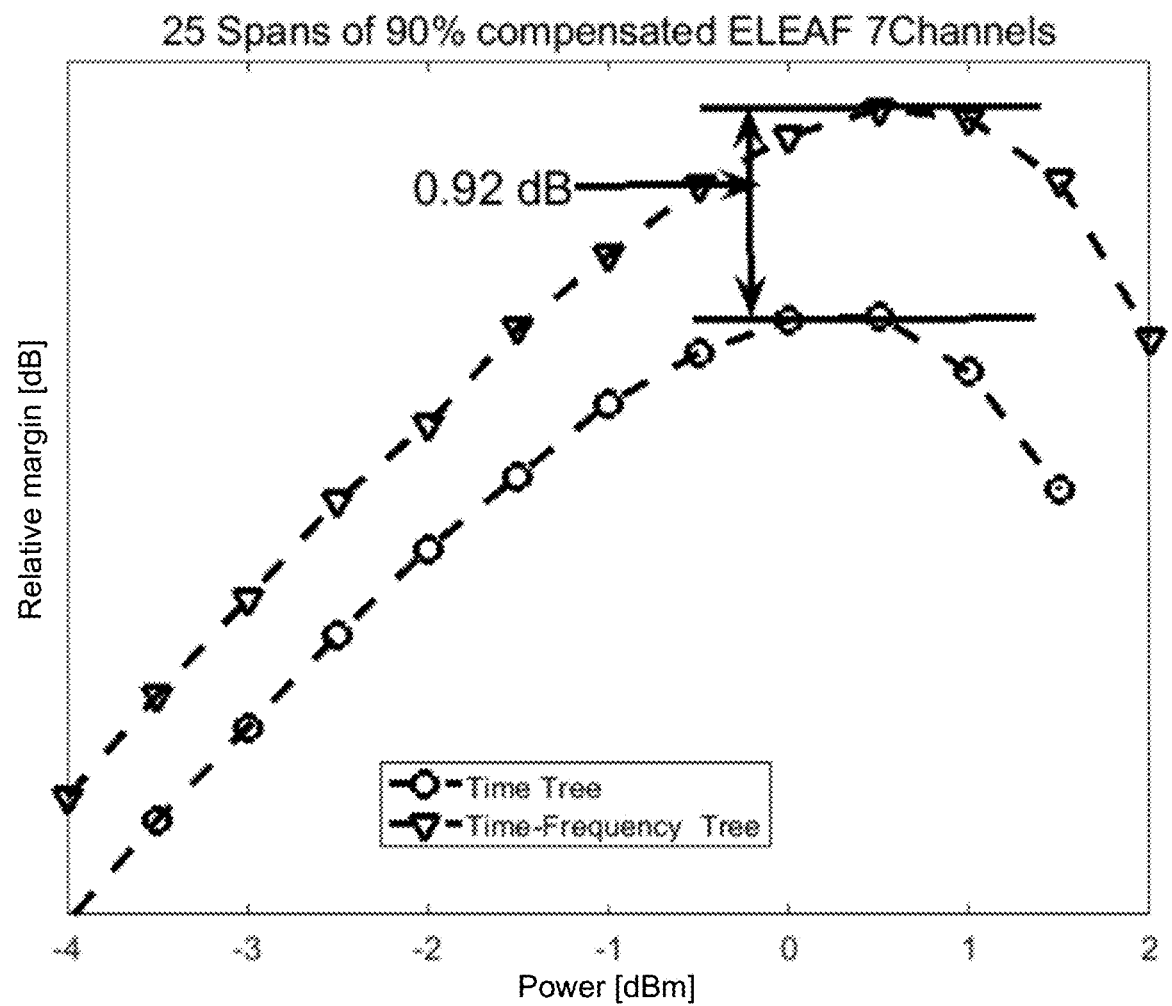
FIG. 10 is a plot of relative margin (dB) as a function of launch power (dBm) for PCS across both time and frequency relative to PCS across time only, according to an example simulation.

FIG. 10 is a plot of relative margin (dB) as a function of launch power (dBm) for PCS across both time and frequency relative to PCS across time only, according to an example simulation. The simulation was based on a coherent FDM system having a 7 WDM channels, each having four FDM subcarriers and spanning 2000 km of 95% optically dispersion-compensated ELEAF with a client rate of 200 Gbps. The curve denoted by circular markers represents the system margin achieved with a first tree encoding design in which a separate tree encoder is applied to each of the four FDM subcarriers. The curve denoted by triangular markers represents the system margin achieved with a second tree encoding design in which a single tree encoder is applied across all four of the FDM subcarriers. Both curves are normalized by the maximum system margin of the first tree encoding design. A comparison of the curves demonstrates that the second tree encoding design provides a 0.92 dB improvement in the system margin relative to the first tree encoding design. Thus, encoding across both time and frequency by using a single tree encoder for all four FDM subcarriers may reduce nonlinear interference, thereby resulting in a higher system margin. In this example, the nonlinear benefit is a result of the correlated symbols output by the tree encoder being mapped to different FDM subcarriers, thereby resulting in symbol energies being correlated across the subcarriers.

By using a single tree encoder to encode shaped symbols across multiple FDM subcarriers, it may be possible to program the tree encoder such that some FDM subcarriers have different data rates than other FDM subcarriers. For example, if no client bits are provided as input to the root layer of the tree encoder, the tree is effectively subdivided into two tree structures each addressing one half of the dimensionality. Each half of the tree encoder may be independently programmed for different capacities, while the permutation function may be programmed to map the higher of the two capacities to the innermost FDM subcarriers, while the lower capacity is mapped to the outermost FDM subcarriers. Similarly, if no client bits are provided as input to the two highest layers of the tree, the tree is effectively subdivided into four tree structures each addressing one quarter of the dimensionality. Each quarter of the tree encoder may be programmed for different capacities, while the permutation function may be programmed to map the outputs to appropriate FDM subcarriers. This process may be continued to lower layers of the tree, although the benefit probabilistic shaping and achievable capacity are both reduced as layers of the tree are removed.

This process may be advantageous when there is noise or distortion that varies across FDM subcarriers. For example, for a first FDM subcarrier that is experiencing (or is expected to experience) higher noise or distortion, it may be advantageous to reduce the capacity of the first FDM subcarrier by programming the tree encoder to ensure that the subset of shaped symbols that are encoded on the first FDM subcarrier have a lower average visitation probability, thereby improving the tolerance to noise. At the same time, a second FDM subcarrier that is experiencing (or is expected to experience) lower noise or distortion may compensate for the reduced capacity of the first FDM subcarrier by arranging for the subset of shaped symbols that are encoded on the second FDM subcarrier to have a higher average visitation probability. In this manner, the capacity of individual FDM subcarriers may be varied in order to improve noise tolerance, while keeping the total capacity of the channel fixed. For example, the capacities of the outermost FDM subcarriers may be reduced in order to tolerate linear crosstalk from adjacent WDM channels, while the capacities of the other FDM subcarriers may be increased by a corresponding amount.

Tailoring the capacities of different FDM subcarriers would be difficult for designs in which a different tree encoder is applied to each FDM subcarrier, since each tree encoder would typically be programmed for a fixed capacity, and any changes in this capacity would require complicated rate throttling. In contrast, where a single tree encoder is applied across multiple FDM subcarriers, it is possible to tailor the respective capacities of the FDMs by a simple reprogramming of the LUTs at the optical transmitter, and a corresponding reprogramming of the LUTs at the optical receiver.

Figure 11:
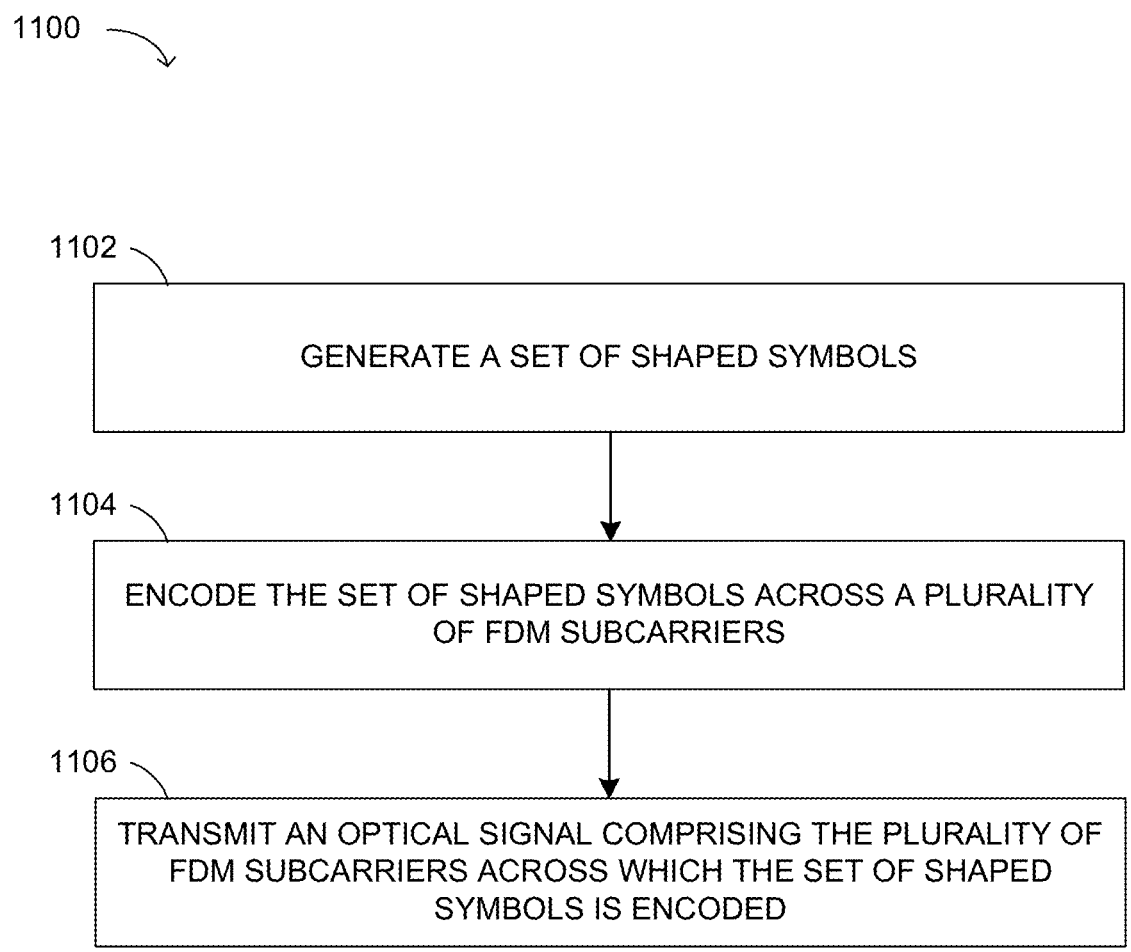
FIG. 11 illustrates an example method performed at an optical transmitter in accordance with the technology disclosed herein.

FIG. 11 illustrates an example method 1100 performed at an optical transmitter, such as the optical transmitter 800, in accordance with the technology disclosed herein.

At 1102, a set of symbols may be generated from a plurality of encoded client bits, each symbol corresponding to a constellation point selected from a set of constellation points exhibiting non-uniform visitation probabilities. In other words, PCS encoding may be applied to a plurality of client bits to generate a set of shaped symbols. According to some examples, the PCS encoding may be implemented using a single tree encoder. For example, the optical transmitter 800 may execute instructions or code which implements the tree encoding 803, the FEC encoding 805, the symbol selection 807, and the quadrant selection 809 in order to generate a set of shaped symbols 814 from the client bits 802. The tree encoding may be implemented using a plurality of LUTs, such as LUTs 210, 214, 218 of the PCS structure 200. The LUTs may be programmed based on one or more properties of an optical communication link over which the optical signal is to be transmitted. For example, the LUTs may be programmed based on a net dispersion of the link. The LUTs may also be reprogrammed to reflect changes in link properties. In another example, the PCS encoding may be implemented using algebraic encoding instead of tree encoding.

At 1104, the set of shaped symbols may be encoded across a plurality of FDM subcarriers. Different subsets of the set of symbols may be encoded on different FDM subcarriers. For example, the optical transmitter 800 may execute instructions or code which causes the permutation function 811 to reorder or rearrange the set of shaped symbols 814 into the set of shaped symbols 816, and causes the set of shaped symbols 816 to be encoded across a plurality of FDM subcarriers, such that different subsets of the shaped symbols 814 are encoded on different FDM subcarriers. As previously described, the subsets may comprise consecutive symbols within the set of shaped symbols 814, or non-consecutive symbols within the set of shaped symbols 814. The subsets may exhibit different average visitation probabilities, thereby resulting in the FDM subcarriers having different capacities. The permutation function may be programmed based on or more properties of the optical communication link over which the optical signal is to be transmitted. For example, the permutation function may be programmed based on a net dispersion of the link. The permutation function may also be reprogrammed to reflect changes in link properties. The programming of the LUTs used for tree encoding and permutation function may also be jointly optimized to achieve temporal and frequency correlations between symbols on different FDM subcarriers, beneficial for nonlinear propagation.

At 1106, an optical signal may be transmitted over an optical communication link to an optical receiver, where the optical signal comprises the plurality of FDM subcarriers across which the set of shaped symbols 816 is encoded. For example, the optical transmitter 800 may execute instructions or code which causes the plurality of FDM subcarriers, across which the set of shaped symbols 816 is encoded, to be transmitted in the optical signal 864. The transmission may involve the transmit DSP 801 generating the digital drive signals 820, 822, 824, 826, which are converted by the DACs 828, 830, 832, 834 into the analog drive signals 836, 838, 840, 842, respectively, and the analog drive signals 836, 838, 840, 842 being used to drive the electrical-to-optical modulators 854, 856.

Figure 12:
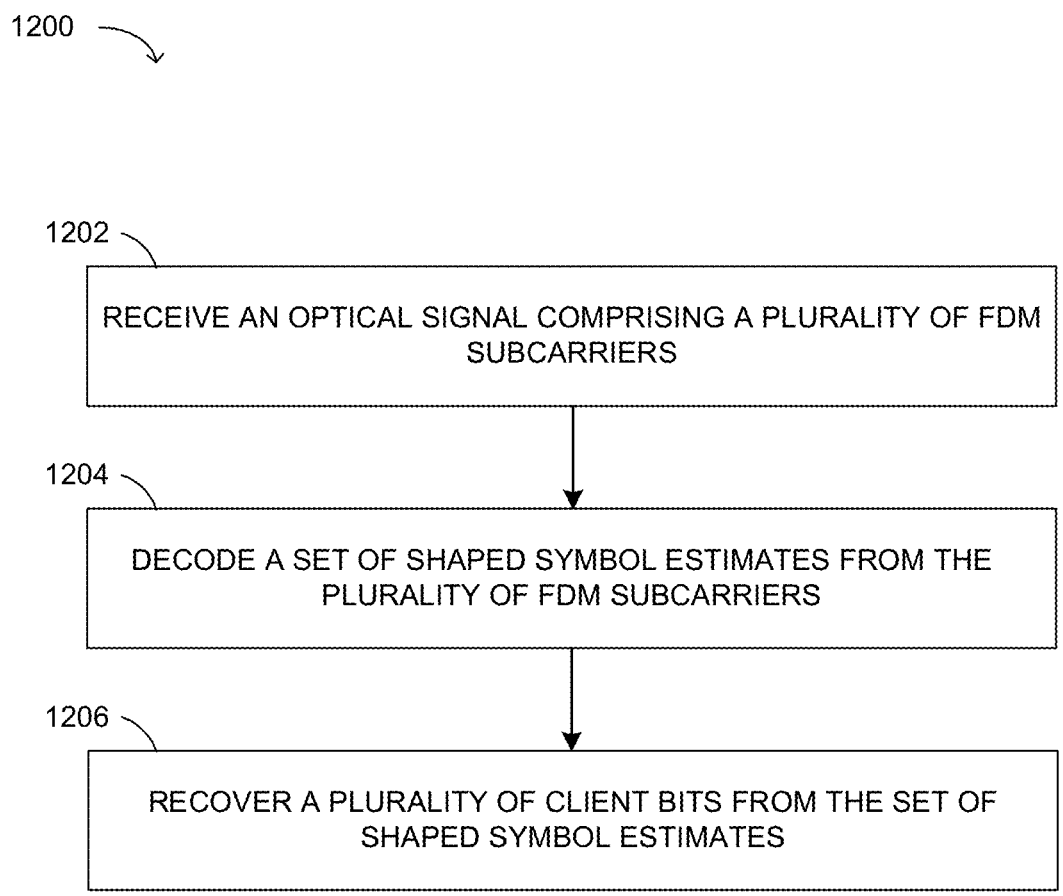
FIG. 12 illustrates an example method performed at an optical receiver in accordance with the technology disclosed herein.

FIG. 12 illustrates an example method 1200 performed at an optical receiver, such as the optical receiver 900, in accordance with the technology disclosed herein.

At 1202, an optical signal may be received at the optical receiver, where the optical signal comprises a plurality of FDM subcarriers. For example, the optical receiver 900 may receive the optical signal 964. The receiving may involve the polarizing beam splitter 948 splitting the received optical signal 964 into orthogonally-polarized components 958, 960, and the optical hybrid 925 processing the components 958, 960 with respect to the optical signal 946 produced by the laser 944. The receiving may further include the photodetectors 923 converting the outputs 950, 952, 954, 956 of the optical hybrid 925 to the received analog signals 936, 938, 940, 942, respectively. The receiving may further include the ADCs 928, 930, 932, 934 sampling the received analog signals 936, 938, 940, 942, respectively, to generate the received digital signals 920, 922, 924, 926, respectively.

At 1204, a set of symbol estimates may be decoded from the plurality of FDM subcarriers, each symbol estimate corresponding to a constellation point selected from a set of constellation points exhibiting non-uniform visitation probabilities. In other words, the symbol estimates may be "shaped", in that they comprise estimates of shaped symbols that have been generated using PCS encoding. The set of shaped symbol estimates may comprise different subsets of shaped symbol estimates decoded from different FDM subcarriers. For example, the optical receiver 900 may execute instructions or code which implements the symbol recovery 921 and the symbol processing 919, in order to recover the set of shaped symbol estimates 916.

At 1206, a plurality of client bits may be recovered from the set of shaped symbol estimates. In other words, PCS decoding may be applied to the set of shaped symbol estimates in order to recover client bits. According to some examples, the PCS decoding may be implemented using a single tree decoder. For example, the optical receiver 900 may execute instructions or code which implements the demapping 913, the FEC decoding 905, the inverse permutation function 911, and the tree decoding 903 in order to recover the corrected bits 902 from the shaped symbol estimates 916. The tree decoding may be implemented using a plurality of LUTs, such as LUTs 710, 714, 718 of the PCS structure 700. The LUTs of a tree decoder may be programmed to invert the operations of the respective LUTs of a tree encoder implemented at an optical transmitter. In another example, the PCS decoding may be implemented using algebraic decoding instead of tree decoding.

PCS encoding using tree encoding induces temporal correlations in the energy of encoded optical symbols. As has been described in detail herein, these temporal correlations may be exploited to achieve nonlinear propagation benefits by encoding data from a single tree encoder across multiple FDM subcarriers, thereby realizing time-frequency encoding.

Time-frequency encoding across multiple FDM subcarriers may also be realized using PCS encoding techniques other than tree encoding. For example, the programming of an algebraic encoder could be modified to achieve PCS across blocks of several symbols in time across multiple FDM subcarriers. While the algebraic encoder may not provide nonlinear benefits when optimized for linear performance, the algebraic encoder could be reprogrammed to take advantage of time-frequency encoding.

The scope of the claims should not be limited by the details set forth in the examples, but should be given the broadest interpretation consistent with the description as a whole.

What is claimed is:

1. An optical transmitter comprising:
    a processor; and
    a memory storing computer-executable instructions which, when executed by the processor, cause the optical transmitter
        to generate, from a plurality of encoded client bits, a set of symbols exhibiting non-uniform visitation probabilities in at least one dimension;
        to encode the set of symbols across a plurality of frequency division multiplexing (FDM) subcarriers, wherein different subsets of the set of symbols are encoded on different FDM subcarriers using a permutation function available at the optical transmitter; and
        to transmit an optical signal comprising the plurality of FDM subcarriers across which the set of symbols is encoded.

2. The optical transmitter as claimed in claim 1, wherein at least one of the different subsets comprises consecutive symbols within the set of symbols.

3. The optical transmitter as claimed in claim 1, wherein at least one of the different subsets comprises non-consecutive symbols within the set of symbols.

4. The optical transmitter as claimed in claim 1, wherein the permutation function is programmed based on one or more properties of an optical communication link over which the optical signal is transmitted.

5. The optical transmitter as claimed in claim 1, wherein the permutation function is programmed to provide different capacities on different FDM subcarriers.

6. The optical transmitter as claimed in claim 1, wherein the computer-executable instructions, when executed by the processor, further cause the optical transmitter:
to generate the encoded client bits using a plurality of programmable look-up tables (LUTs) available at the optical transmitter.

7. The optical transmitter as claimed in claim 6, wherein the plurality of LUTs are programmed based on one or more properties of an optical communication link over which the optical signal is transmitted.

8. An optical receiver configured to receive an optical signal over an optical communication link established between the optical receiver and an optical transmitter, wherein the received optical signal comprises a plurality of frequency division multiplexing (FDM) subcarriers, the optical receiver comprising:
a processor; and
a memory storing computer-executable instructions which, when executed by the processor, cause the optical receiver
to decode a set of symbol estimates from the plurality of FDM subcarriers, the symbol estimates comprising estimates of symbols exhibiting non-uniform visitation probabilities in at least one dimension, wherein different subsets of the symbol estimates are decoded from different FDM subcarriers using an inverse permutation function available at the optical receiver; and
to recover a plurality of client bits from the set of symbol estimates.

9. The optical receiver as claimed in claim 8, wherein at least one of the different subsets comprises consecutive symbol estimates of the set of symbol estimates.

10. The optical receiver as claimed in claim 8, wherein at least one of the different subsets comprises non-consecutive symbol estimates of the set of symbol estimates.

11. The optical receiver as claimed in claim 8, wherein the computer-executable instructions, when executed by the processor, further cause the optical receiver:
to recover the plurality of client bits using a plurality of look-up tables (LUTs) available at the optical receiver.

12. The optical receiver as claimed in claim 8, wherein the inverse permutation function is programmed based on one or more properties of the optical communication link.

13. The optical receiver as claimed in claim 8, wherein the inverse permutation function is programmed to achieve different capacities on different FDM subcarriers.

14. The optical receiver as claimed in claim 11, wherein the plurality of LUTs are programmed based on one or more properties of the optical communication link.

15. A method performed at an optical transmitter, the method comprising:
generating, from a plurality of encoded client bits, a set of symbols exhibiting non-uniform visitation probabilities in at least one dimension;
encoding the set of symbols across a plurality of frequency division multiplexing (FDM) subcarriers, wherein different subsets of the set of symbols are encoded on different FDM subcarriers using a permutation function available at the optical transmitter; and
transmitting an optical signal comprising the plurality of FDM subcarriers across which the set of symbols is encoded.

16. The method as claimed in claim 15, wherein at least one of the different subsets comprises consecutive symbols of the set of symbols.

17. The method as claimed in claim 15, wherein at least one of the different subsets comprises non-consecutive symbols of the set of symbols.

18. The method as claimed in claim 15, wherein the permutation function is programmed based on one or more properties of an optical communication link over which the optical signal is transmitted.

19. The method as claimed in claim 15, further comprising
generating the encoded client bits using a plurality of look-up tables (LUTs) available at the optical transmitter.

20. The method as claimed in claim 19, wherein the plurality of LUTs are programmed based on one or more properties of an optical communication link over which the optical signal is transmitted.

* * * * *